United States Patent
Tamburrini et al.

(12) 
(10) Patent No.: US 6,575,368 B1
(45) Date of Patent: Jun. 10, 2003

(54) MULTIPLE APERTURE DATA READER FOR MULTI-MODE OPERATION

(75) Inventors: Thomas E. Tamburrini, Eugene, OR (US); Michael L. Duncan, Portland, OR (US); Michael J. Ahten, Eugene, OR (US); Bryan L. Olmstead, Eugene, OR (US); Paul R. Huss, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 08/792,829

(22) Filed: Jan. 30, 1997

Related U.S. Application Data
(60) Provisional application No. 60/010,935, filed on Jan. 31, 1996.

(51) Int. Cl.[7] .................................................. G06K 7/10
(52) U.S. Cl. .............................. 235/462.25; 235/462.32
(58) Field of Search ...................... 235/462.01, 462.24, 235/462.25, 462.26, 462.37, 462.38, 462.39, 472.01, 492

(56) References Cited

U.S. PATENT DOCUMENTS

| | | | |
|---|---|---|---|
| 4,560,862 A | 12/1985 | Eastman et al. | 235/467 |
| 4,933,538 A | 6/1990 | Heiman et al. | 235/462 |
| 4,938,551 A | 7/1990 | Matsumoto | 350/6.7 |
| 4,939,355 A | 7/1990 | Rando et al. | 325/467 |
| 4,939,356 A | 7/1990 | Rando et al. | 235/467 |
| 4,971,410 A | 11/1990 | Wike et al. | 350/6.5 |
| 5,000,529 A | 3/1991 | Katoh et al. | |
| 5,073,702 A | 12/1991 | Schuhmacher | 235/467 |
| 5,146,463 A | 9/1992 | Rando | 372/24 |
| 5,175,421 A | 12/1992 | Harris | 235/467 |
| 5,198,650 A | 3/1993 | Wike, Jr. | 235/467 |
| 5,206,491 A | 4/1993 | Katoh et al. | 235/467 |
| 5,235,167 A * | 8/1993 | Dvorkis et al. | 235/462 |
| 5,250,791 A | 10/1993 | Heiman et al. | 235/462 |
| 5,268,565 A | 12/1993 | Katoh et al. | 235/467 |
| 5,296,689 A | 3/1994 | Reddersen et al. | 235/467 |
| 5,314,631 A | 5/1994 | Katoh et al. | 235/467 |
| 5,317,166 A * | 5/1994 | Tafoya | 250/568 |
| 5,340,971 A | 8/1994 | Rockstein et al. | 235/472 |
| 5,468,951 A * | 11/1995 | Knowles et al. | 235/472.01 |
| RE35,117 E | 12/1995 | Rando et al. | 235/375 |

(List continued on next page.)

FOREIGN PATENT DOCUMENTS

| | | | |
|---|---|---|---|
| EP | 0 539 054 A1 | 4/1993 | |
| EP | 0 755 018 A2 | 1/1997 | |
| EP | 0 772 147 A2 | 5/1997 | |
| EP | 0 779 591 A2 | 6/1997 | |
| JP | 07-183768 | 7/1995 | G06K/7/10 |
| JP | 9-91368 | 4/1997 | G06K/7/10 |

OTHER PUBLICATIONS

NCR Model 7860 Hand–Held Scanner (three photographs); manufacture label dated Sep. 1990.

Article entitled *Optical Design and Development of a Small Barcode Scanning Module*, Charles K. Wike and Joseph M. Lindacher, SPIE vol. 1398 CAN–AM Eastern 1990 pp. 119–126 (®1991 by the Society of Photo–Optical Engineers).

*Primary Examiner*—Thien M. Le
(74) *Attorney, Agent, or Firm*—Stoel Rives LLP

(57) ABSTRACT

A data reader and method for data reading, such as a barcode scanner, wherein the scan pattern generating optics and other features are optimized for different modes of operation. In a preferred embodiment, different patterns are projected from different apertures in the scanner housing, one scan pattern optimized for handheld operation and the other optimized for fixed operation. Other optimizable features include the presence or absence of an aiming beam, which may be generated from the same laser source as the scan pattern or from another source, and enabling or disabling decoding of the signal received signal during a portion of a facet wheel rotation. Decoding may be disabled while the scan line(s) for handheld use is generated unless a switch or trigger is actuated.

27 Claims, 15 Drawing Sheets

U.S. PATENT DOCUMENTS

| | | | |
|---|---|---|---|
| 5,475,207 A | 12/1995 | Bobba et al. | 235/467 |
| 5,479,011 A | 12/1995 | Rudeen et al. | 250/235 |
| 5,491,328 A | 2/1996 | Rando | 235/462 |
| 5,504,316 A * | 4/1996 | Bridgelall et al. | 235/462 |
| 5,528,024 A * | 6/1996 | Rockstein et al. | 235/472 |
| 5,693,930 A * | 12/1997 | Katoh et al. | 235/467 |
| 5,719,385 A * | 2/1998 | Wike, Jr. et al. | 235/467 |
| 5,750,975 A * | 5/1998 | Myerson et al. | 235/472.01 |
| 5,818,028 A * | 10/1998 | Meyerson et al. | 235/472.01 |
| 5,834,749 A * | 11/1998 | Durbin | 235/454 |
| 5,837,987 A * | 11/1998 | Koenck et al. | 235/472.01 |
| 5,988,508 A * | 11/1999 | Bridgelall et al. | 235/462.04 |
| 6,053,413 A | 4/2000 | Swift et al. | 235/472.01 |
| 6,161,759 A * | 12/2000 | Moss et al. | 235/462.01 |
| 6,164,546 A * | 12/2000 | Kumagai et al. | 235/472.01 |
| 6,247,647 B1 | 6/2001 | Courtney et al. | 235/462.36 |
| 6,279,829 B1 * | 8/2001 | Hems et al. | 235/462.01 |

* cited by examiner

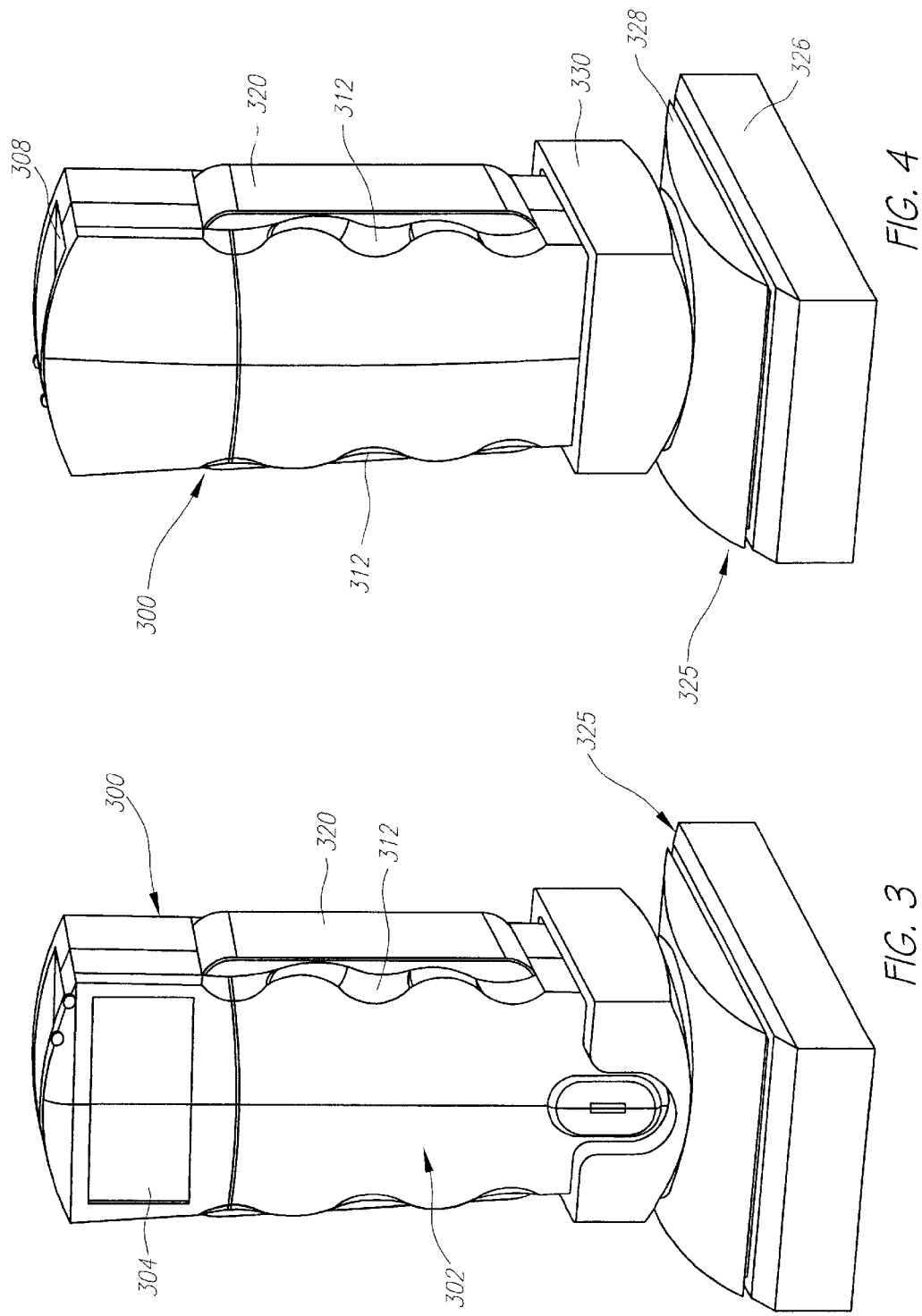

MULTIPLE APERTURE DATA READER FOR MULTI-MODE OPERATION

This application is a continuing application of Ser. No. 60/010,935 filed Jan. 31, 1996.

BACKGROUND

The field of the present invention relates to data readers, such as scanners and bar code reading devices. In particular, barcode readers are described herein which may be used in both fixed and handheld scanning applications by utilizing distinct optical scan patterns for fixed operation and handheld operation. Each scan pattern is optimized for its respective mode of operation, thereby avoiding performance degrading compromises necessary when a single scan pattern is used for both modes of operation.

A barcode label comprises a series of parallel dark bars of varying widths with intervening light spaces, also of varying widths. The information encoded in the barcode is represented by the specific sequence of bar and space widths, the precise nature of this representation depending on which particular barcode symbology is in use. Typical methods for reading barcodes comprise generation of an electronic signal wherein a signal voltage alternates between two preset voltage levels, one representing a dark bar and the other representing a light space. The temporal widths of these alternating pulses of high and low voltage levels correspond to the spatial widths of the bars and spaces. It is this temporal sequence of alternating voltage pulses of varying widths which is presented to an electronic decoding apparatus for decoding.

One common type of bar code readers are spot scanners in which a source of illumination is moved (i.e., scanned) across the barcode while a photodetector monitors the reflected or backscattered light. For example, the photodetector may generate a high voltage when a large amount of light scattered from the barcode impinges on the detector, as from a light space, and likewise may produce a low voltage when a small amount of light scattered from the barcode impinges on the photodetector, as from a dark bar. The illumination source in spot scanners is a typically a laser, but may comprise a coherent light source (such as a laser or laser diode) or non-coherent light source (such as light emitting diode). A laser illumination source may offer advantages of higher intensity illumination which may allow barcodes to be read over a larger range of distances from the barcode scanner (large depth of field) and under a wider range of background illumination conditions.

The reading spot of the scanner may be manually moved across the bar code, this type of reader being typically referred to as a wand. Alternately, the spot may be automatically moved or scanned across the bar code in a controlled pattern. A scanning mechanism may comprise a rotating mirror facet wheel, an oscillating mirror, or other suitable means for repetitively moving the illumination beam. The path followed by the scanned illumination beam is referred to as a scan line. Typically, an individual scan line extends across the barcode for the barcode to be successfully read unless specialized piecing software (known as stitching) or electronics are utilized. In addition to the scan engine, a barcode scanner may also employ a set of scan pattern generating optics to produce a multiplicity of scan lines in various directions from the scanner and at varying orientations, thereby allowing barcodes to be read over a large angular field of view and over a wide range of orientations (i.e., a multi-dimensional scan pattern). The scan pattern generating optics typically comprise a set of mirrors aligned at varying angles, each of which intercepts the illumination beam during a portion of its motion and projects it into the region in front of the barcode scanner, hereinafter referred to as the scan volume. Each mirror or mirror set, in conjunction with the scanning mechanism, produces a scan line at a particular position and at a particular orientation.

Another type of data reader is an image reader, such as a CCD reader (charge coupled device), in which an entire line of the bar code image is focused onto a detector array. A CCD reader typically includes a light source to illuminate the bar code to provide the required signal response. For the purposes of this description, the word "scanner" may refer to data readers of both the spot scanner type and the line image type. The following description will focus on barcode reading, but is generally applicable other types of symbol reading or object identification.

Operational there are generally two types of scanners are operated in one of two modes, fixed and portable. In the fixed mode of operation, the barcode scanner is fixed while barcoded objects are passed through or held within a relatively large scan volume. In the portable mode of operation, the barcode scanner is moved to the barcode label to be read.

In the fixed mode of operation, a relatively wide angular field of view is required so that a barcode label can be read from the largest possible fraction of the surface of the barcoded object. Since objects are often passed through the scan volume in random orientations, a multi-dimensional pattern is necessary to efficiently read the barcode. In addition, a high scan rate is desirable to allow successful reading of barcodes which are quickly passed through the scan volume.

A simpler scan pattern or a single scan line is often sufficient for portable operation, since the relatively small portable barcode scanner can be rotated to orient the scan line correctly across the barcode. A relatively small angular field of view and a relatively longer depth of field are desirable in this mode of operation. The longer depth of field may also allow the operator to read the barcode from a greater (or closer) distance. The reduced angular field of view reduces the likelihood of inadvertent scanning of other barcode labels, but in turn leads to tighter aiming requirements. To facilitate proper orientation of the scan line relative to the barcode and aiming of the scanner, the scan line may be made sufficiently intense to be seen by the operator. Alternatively, a portable barcode scanner may be provided with pointer illuminators to facilitate aiming of the barcode scanner.

The optimum parameters of operation for a fixed barcode scanner operation are frequently quite different from those of a portable barcode scanner. The particular parameters exhibiting major differences include: number of scan lines, orientation and position of scan lines; angular field of view; depth of field; scan speed; and illumination intensity. However, it may be desirable to produce a barcode scanner capable of both fixed and portable modes of operation. Previously this combined operation has been accomplished by compromising among the various requirements for fixed and portable modes of operation, yielding a barcode scanner which can be used in both modes of operation but with performance inferior to barcode scanners designed for one mode of operation only. The barcode scanners currently in use project the pattern from a single aperture. In order for a user to use the device in portable mode, extensive orientation of the bar code scanner is required to aim the scan pattern at the bar code. Once the bar code has been read, further manipulation is required to return the scanner to a position suitable for fixed scanning.

SUMMARY OF THE INVENTION

The present invention is directed to a data reader such as a barcode scanner wherein the scan pattern generating optics employed are optimized for different modes of operation. In a preferred embodiment, different patterns are projected from different apertures in the scanner housing, one scan pattern optimized for handheld operation and the other optimized for fixed operation. Alternately or in addition other features besides the scan pattern may be optimized for fixed and handheld modes. These features include, among others, the presence or absence of an aiming beam, which may be generated from the same laser source as the scan pattern (a preferred embodiment) or from another source, and enabling or disabling decoding of the signal received signal during a portion of a facet wheel rotation. In a preferred embodiment, decoding is disabled while the scan line(s) for handheld use is generated unless a switch or trigger is actuated. Alternately first one scan pattern is not generated when the scanner is in the second mode of operation.

In one embodiment of the present invention, a single set of pattern generating optics is employed to simultaneously project a plurality of scan patterns, one scan pattern optimized for fixed and performance and one scan pattern optimized for portable performance. In another embodiment, a single set of pattern generating optics is switched between a scan pattern optimized for fixed mode reading and a scan pattern optimized for portable mode reading. In one preferred embodiment, separate and distinct scan pattern generating optics are employed, thereby allowing independent optimization of the performance characteristics of the barcode scanner for each mode of operation.

A barcode scanner incorporating the present invention offers the advantage of flexibility for the end user, in that one device can be used in multiple modes of operation without suffering from inferior performance characteristics of previously available fixed/portable barcode scanners. The device described herein exhibits performance characteristics in each mode of operation comparable to those of barcode scanners designed for only one mode of operation or the other. The multiple aperture embodiment may also minimize the manipulation of the scanner required for a user to aim the scanner when the scanner is in portable mode and allowing the user to easily return the scanner to fixed mode.

BRIEF DESCRIPTION OF THE DRAWINGS

FIG. 3 is a front left side perspective view of a bimodal scanner positioned in a base unit;

FIG. 4 is a rear right side perspective view of the scanner and base unit of FIG. 3;

DETAILED DESCRIPTION OF THE PREFERRED EMBODIMENTS

Preferred embodiments will now be described with reference to the drawings. For clarity of description, any identifying numeral representing an element in one figure will represent the same element when used in any other figure.

Figure 1:
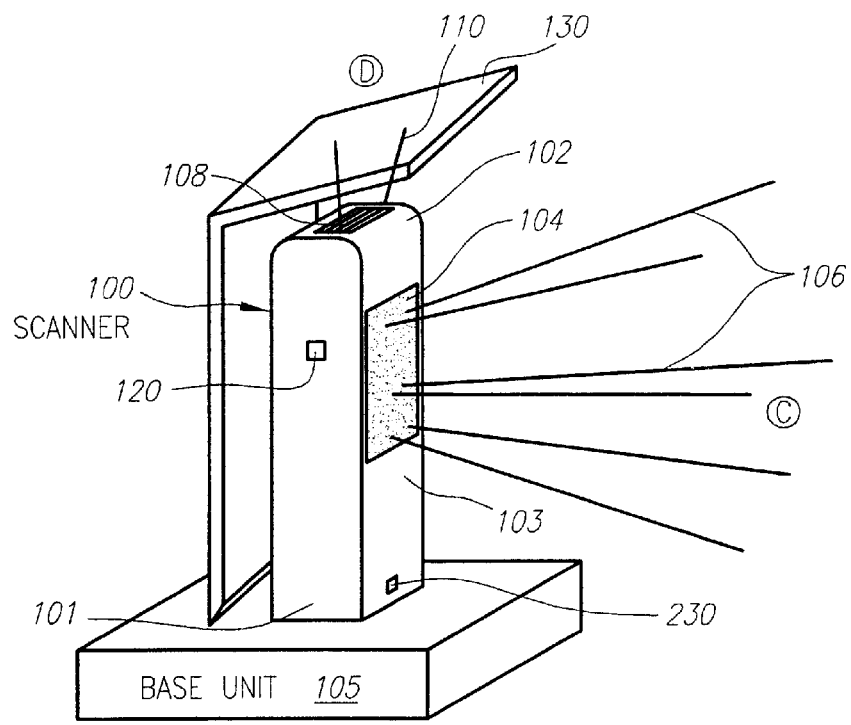
FIG. 1 illustrates a multiple window barcode reader suitable for both fixed and handheld operation.
Figure 2:
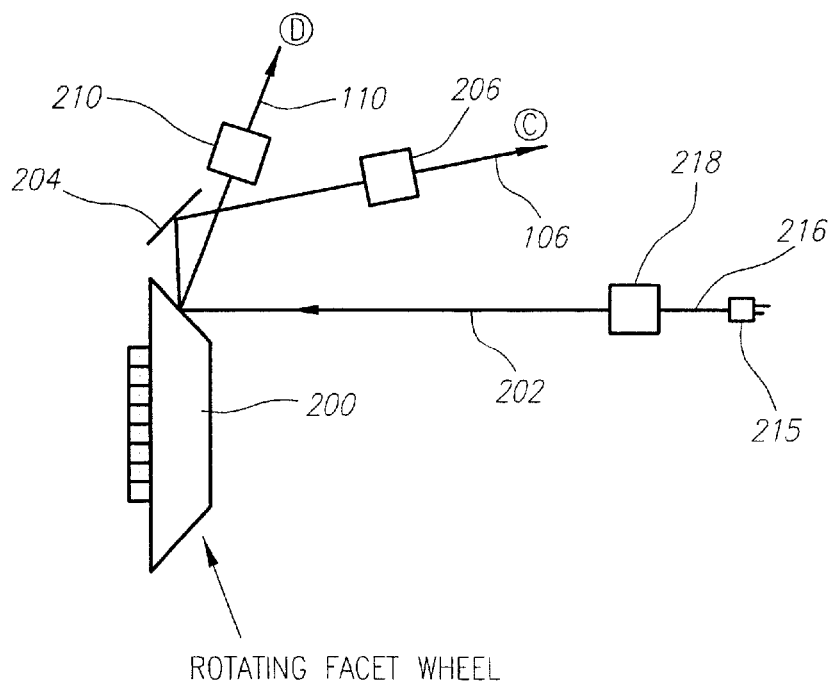
FIG. 2 illustrates a rotating facet wheel scan engine and two sets of scan pattern generating optics.

FIGS. 1–2 illustrate a preferred embodiment of a multiple-mode data reading device, in this embodiment a bar code scanner 100. The barcode scanner 100 includes a top portion 102 and a bottom portion 101. The scanner 100 rests on a base unit 105. A first scan window 104 is shown on the front side 103 of the barcode scanner 100 through which a first scan pattern 106 is projected into a first scan volume C in front of the first scan window 104. A second scan window 108 is positioned on the top portion 102 of the barcode scanner 100 through which a second scan pattern 110 is projected into a second scan volume D in front of the second scan window 108.

The barcode scanner 100 is placed in base unit 105 which supports the scanner for operation in the fixed mode. For operating in the fixed mode, the scan pattern 106 is optimized for fixed scanning within the scan volume C in front of scan window 104. The fixed mode scan pattern 106 preferably comprises a multi-dimensional or complex scan pattern, such as an asterisk or horse collar pattern) with a relatively large angular field of view suitable for fixed scanning applications. The scan pattern 106 is preferably sufficiently dense so as to successfully read bar codes oriented in various orientations on objects passed through or placed within the scan volume in front of the scan window 104.

When the portable mode of operation is desired, the operator may lift barcode scanner 100 from the base unit 105. The scan pattern 110 produced from scan lines passing through the second window 108 is optimized for portable operation. In portable mode operation, the operator aims the barcode scanner 100 to orient the place the scan pattern across the barcode. The portable mode scan pattern 110 preferably comprises a pattern of one or a few scan lines (e.g. two or three parallel or slightly overlapping scan lines) with a longer depth of field and smaller angular field of view relative to fixed mode scan pattern 106. The handheld mode scan pattern 110 permits the user to aim the scan pattern onto a particular bar code, such as one bar code out of several located on an object, reading only a single bar code as desired.

The placement of the scan windows 104 and 108 may be varied considerably in keeping with desired multi-modal operational characteristics set forth herein. Alternative embodiments of barcode scanner 100 may have scan window 108 located on any of the sides of the unit, or even on the bottom of the unit. Ergonomic considerations specific to a particular device in its particular environment will determine the optimum relative placement of the scan windows 104 and 108 on the scanner 100.

A variety of methods may be used to generate the two distinct scan patterns 106 and 110. FIG. 2 illustrates one embodiment of a scan engine and optics for generating the scan patterns 106 and 110 using a moving spot generated from a laser beam. A laser diode 215 generates a laser beam 216 which is focused by focusing optics 218 to form a reading beam 202 having the desired focal properties. The reading beam 202 is directed onto a rotating facet wheel 200 which includes at least two sets of mirror facets. The mirror facets are set at two or more different angles. The first mirror facet set (having one or more facets) is aligned to direct the reading beam 202 onto steering mirror 204, which in turn directs the reading beam 202 to the first scan pattern generating optics 206, which may be comprised of for example a plurality of pattern mirrors, thereby generating first scan pattern 106 comprised of one or more scan lines. Scan pattern generating optics (diagrammatically designated by element numeral 206) may encompass the steering mirror 204.

A second mirror facet set (having one or more facets) of the facet wheel 200 is aligned so that the reading beam 202 is directed to miss the steering mirror 204 and instead hit the second scan pattern generating optics (diagrammatically designated by element numeral 210 and comprised of a plurality of pattern mirrors for example), thereby generating the second scan pattern 110. Each of the scan patterns 106 and 110 may be optimized independently for fixed or portable operation as required, since the optics 206 and 210 preferably are completely separate and distinct. Either or both of the scan pattern generating optics 206 and 210 may include additional focusing optics to modify the depth of field, the focal distance, or the angular field of view of the scan patterns 106 and 110, respectively. The focusing optics 218 may include focusing capability, such as disclosed in Rudeen U.S. Pat. No. 5,479,011 herein incorporated by reference, for focusing the reading beam at different distances depending upon the mode of operation or depending upon which window 108, 104 the beam is passing.

Alternately the facets of the facet wheel 200 may include focusing capability to provide selective focusing for different modes of operation. U.S. Pat. No. 4,560,862, herein incorporated by reference, discloses using a rotating polygon having mirrors with different curvature on different facets thereof which provides scanning in different focal planes.

In a preferred configuration, the scanning wheel 200 may produce a single scan line through the top window 108 optimized for handheld scanning operation. The pattern mirrors 210 may comprise a single fold mirror or may even be omitted. In such a configuration, the facet wheel 200 may be oriented to direct a scan line from one or more facets directly out the window 108. The scan line(s) 110 directed out of window 108 may be optimized for handheld scanning operation relative to depth of field and distance for focus.

Similarly the steering mirror 204 may be omitted with one mirror facet (or multiple mirror facets) directing a scanning beams across pattern mirrors 206 and for producing scan lines 106 out window 104. The scan line(s) directed out of window 104 may be optimized for fixed mode scanning operation relative scan pattern geometry and density as well as to depth of field and focal distance.

Numerous alternative embodiments of the scan engine and optics shown in FIG. 2 may be employed without departing from the inventive concepts set forth. In the embodiment described above with reference to FIG. 2, both scan patterns 106, 110 are present in either operational mode. It is noted, that since there is only one reading beam 202 (which as a moving spot produces the scan lines), the scans are not actually simultaneous but are sequential. This means that one scan line produced by a mirror facet may pass through the first window 104 and then a scan line produced by the next mirror facet in sequence passes through the second window 108. Because the facet wheel 200 rotates at a relatively high rate (typically in excess of about 2000 rpm), the scan patterns 106, 110 out of both windows 104, 108, are functionally operational though not technically simultaneous.

The scanner 100 may be provided with multiple reading beams such that the two scan patterns 106, 110 are actually produced simultaneously. Such multiple scan pattern generation is disclosed in U.S. Pat. No. 5,475,207 to Bobba et al. herein incorporated by reference. As set forth therein, the multiple reading beams may be formed by, for example, multiple laser diodes or a single laser diode and a beam splitter. Two separate beams may then be directed onto the facet wheel enabling two scanning beams to be generated simultaneously. If desired, the separate beams may be directed simultaneously out of separate windows.

Alternative embodiments may be constructed wherein only one of the scan patterns is in operation at any given time. This design may be accomplished in a variety of ways. Several examples will now be described.

In one alternative configuration, a mechanism may be provided to selectively move the steering mirror 204 into or out of the path of illumination beam 202 as required. Such a mechanism is disclosed in U.S. Pat. No. 5,128,520 which is herein incorporated by reference. Only when the mirror 204 is moved into the path of the reading beam 202 are the scanning beams of the first scan pattern passed to the optics 206, thereby generating first scan pattern 106. Alternately, a movable mirror may be positioned to enable the second scan pattern 110 only when the mirror is moved into the path of the reading beam 202.

Rather than moving a typical mirror, micro mirrors (typically used in an array) may alternately be used for providing the function of the movable mirror. Micro mirrors, such as those used in projection televisions, move by solid state means, which may be advantageous.

In another alternative configuration, the scanner is provided with mechanically or electro-optically operated shuttering of one or both of the scan patterns 106 and 110. For example, a rotating shutter may be placed between steering mirror 204 and rotating facet wheel 200 blocking off reading beam from reaching steering mirror 204 except when desired, such as upon selective actuation of switch 120. Such a shutter mechanism is disclosed in U.S. Pat. No. 5,475,207 incorporated by reference.

Beam selection may also be controlled via LCD modules providing an electronic method to redirect a polarized beam, such as the reading beam from a laser diode. A liquid crystal module and a polarizing mirror are used to redirect or not affect a beam, depending on the state of the liquid crystal module. This may be useful to change scan patterns in different modes of operation, or to produce an aiming beam in handheld mode.

An electro-optical shutter may comprise a liquid crystal module (LCM) and a polarizing mirror in a beam path to redirect a reading beam to generate one scan pattern or the other, depending upon the mode of operation. In one state of the liquid crystal module (LCM), after passing through the LCM the beam is polarized so that it passes through the polarizing mirror. In another state of the LCM liquid crystal, after passing through the LCM the beam is polarized to that it reflects off of the polarizing mirror.

An electro-optic shutter of this sort may also be used to redirect a beam to serve as an aiming beam. In one embodiment, a scan pattern suitable for fixed mode operation may be produced by two or more sources. A scan pattern for handheld use may not need the high density of scan lines generated in such a pattern, so one of the sources may be redirected to form an aiming beam.

Alternately, the beams may be controlled via acousto-optic elements.

Alternately, the scan windows themselves may comprise electro-chromatic materials or LCDs whereby scan lines could be selectively blocked from exiting (or permitted to exit) a selective one of the windows. For example, in the handheld mode the window 104 may be electronically closed off thereby preventing scan lines from exiting that window. All the scan lines 106, 110 could be continually generated, but during portable mode operation for example, only scan lines 110 could exit the scanner 100 because only window 108 would be rendered light transmissive.

In yet another embodiment, a particular operational mode is selected by selectively turning the illumination source 215 on and off as the reading beam 202 is directed onto the facet wheel 200 such that the illumination source is only on when the reading beam 202 hits a selected one or more facets on the facet wheel 200. By such an intermittent operation, the facet wheel 200 may generate a selective one of scan patterns 106, 110.

Any of these methods may be activated manually by the operator, or may be activated automatically as the barcode scanner is picked up and replaced on the base unit 104. For automatic operation, the scanner 100 may be equipped with a motion sensor 230 which senses that the unit has been picked up by the operator. When the sensor 230 detects motion, the scanner is switched to the handheld mode of operation with the first scan pattern 110 being projected through the scan window 108. When the scanner 100 is returned to the base unit 105, and the sensor 230 senses that the scanner is no longer in motion, the scanner 100 is then switched to the fixed mode of operation for scanning with the second scan pattern 106 being projected into the second scan volume in front of the scan window 104.

In an alternative embodiment wherein the portable scan window 108 is located on the bottom of barcode scanner 100, the portable scan pattern 110 would not be usable since it would be obstructed by the base unit 105. In such a configuration, the second scan pattern 110 could nonetheless be deactivated while the scanner 100 is in the base unit 105. The scanner 100 may be provided with a contact switch which activates the second scanning mode when the scanner is removed from the base unit 105.

In another alternate embodiment, the handheld mode is actuated by a manual actuator 120 on the scanner 100 itself. The actuator 120 may require an intentional manipulation by the operator, for example, the actuator may include a slide switch or a trigger which the operator must manually actuate. Alternately, the actuator may include an automatic actuator, such as a sensor, which actuates the handheld operation mode upon grasping of the scanner housing. Alternately, the switch 120 may comprise a sensor which senses the operator's hand contacting the scanner housing, switching the scanner 100 to handheld mode.

The scanner may include a timer for controlling the duration that the scanner switches between modes. For example, actuation of the switch 120 could switch the scanner 100 from the fixed mode to the portable mode, even though the scanner 100 remains in the base unit 105, for a given period such as 30 seconds. Upon timing out the scanner 100 then returns to fixed mode.

In another alternative embodiment, the barcode scanner 100 may include an extra mirror or hood 130 external to the barcode scanner 100 positioned to reflect the scan pattern 110 into the scan volume in front of scan window 104 when barcode scanner 100 is used in fixed mode. The mirror 130 may be attached to the base unit 105 as shown in FIG. 1 or may alternately may be mounted to the scanner 100 itself for example in a removable, pivoting or retractable form.

In the various embodiments of barcode reader 100, the illumination source intensity may be changed depending on mode of operation in use. In the portable or handheld mode of operation, it may be desired to increase the intensity to accommodate extended depth of field and/or to make the scan pattern 110 more visible for aiming. The scan speed may also be altered depending on the mode of operation, with slower scan speeds generally being more desirable for portable operation. Additional illumination sources may be added to act as pointer beams which are particularly desirable while in the portable or handheld mode. Activation and deactivation of these options may be accomplished manually or automatically, as described the above. These and other mode options may be preset at manufacture, selectively activated by setting the option by the vendor or a programming technician, programmed by the operator as described in U.S. Pat. Nos. 4,861,972 or 4,866,257, or set via use of a connection cable as in U.S. Pat. No. 5,330,370, these patents also being incorporated by reference.

Aiming beams to assist the operator in aiming the scanner are particular useful in the portable mode where the scan pattern is preferable a single scan line and often has an extended scan range. Possible methods which may be employed for generating aiming beams are described in U.S. Pat. Nos. 4,603,262, 5,296,689 and 5,146,463, herein incorporated by reference.

Figure 11:
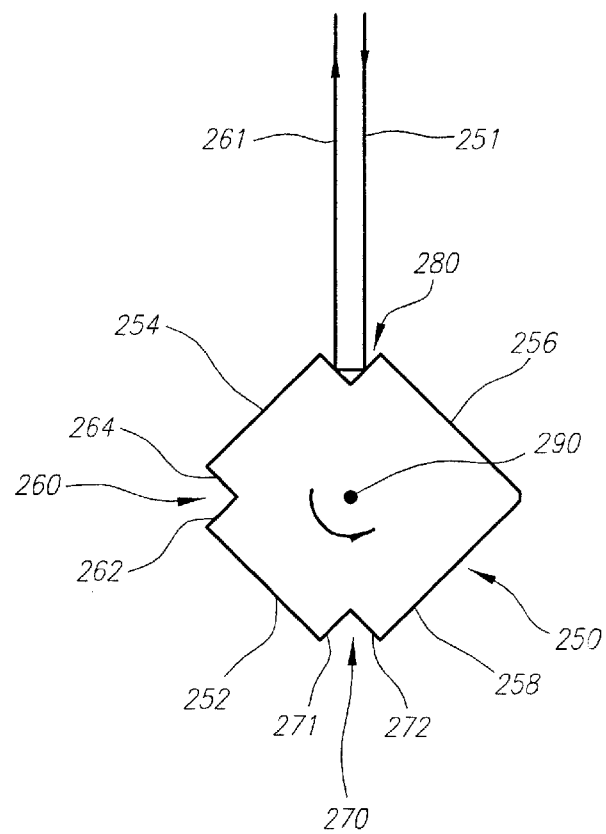
FIG. 11 illustrates a preferred scanning wheel configuration for providing an aiming beam.
Figure 12:
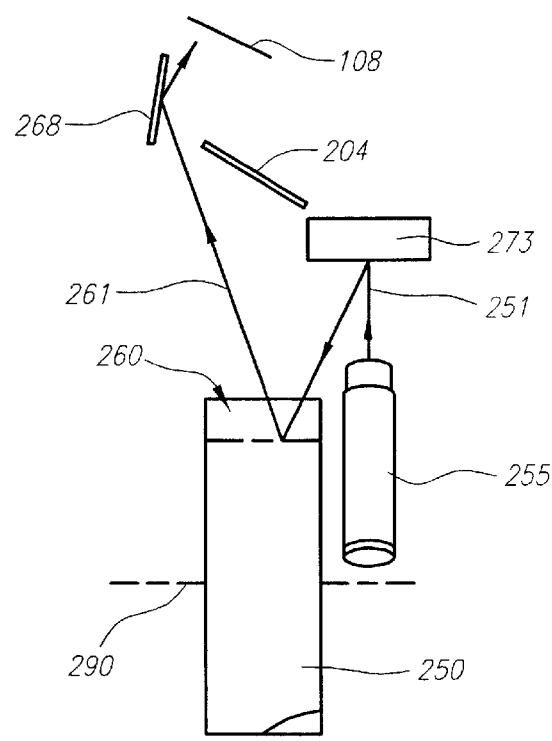
FIG. 12 is a schematic of a preferred scan engine configuration.

One preferred aiming beam generation system is illustrated in FIGS. 11–12 wherein the rotating facet wheel 250 includes four scanning facets 252, 254, 256, 258 with one or more corners 260 of the facet wheel 250 being cutout to form two small facets 262, 264 arranged perpendicularly to one another. As the wheel 250 is rotated, the reading beam 251 impinging on the facets 252, 254, 256, 258 produces scanning beams as the beams are directed across the pattern mirrors as described above with respect to FIGS. 1 and 2. As the beam 251 strikes the corner facets 262, 264 the beam tends to more slowly scan, that is the outgoing beam 261 is directed along parallel paths for the time it takes the reading beam 251 to traverse both corner facets 262, 264. The beam reflected by the corner facets 262, 264 tends to generate a higher brightness forming a more visible line segment aiming beam.

In one aiming beam configuration, the mirror facet 508 is angled to produce the portable mode scan line 110 passing through the upper window 108. Corners 260, 270 on opposite sides of the facet 252 include corner facets 262, 264 and 271, 272. Each of the corner mirror pairs 262 & 264 and 271 & 272 each produces an aiming line segment (per rotation), for example one aiming line segment formed on each end of the scan line 110 produced by facet 508. The aiming line segments may be formed or allowed to exit only in conjunction with the scanning beam 110 in keeping with the various embodiments described herein.

As illustrated in FIGS. 11 and 12, facet wheel 250 may contain one or more corner cubes 260, 270, 280. A corner cube may be used to create an aiming beam for use in handheld mode. A corner cube includes of two facet mirrors whose intersection forms a line which is parallel to the facet wheel axis of rotation 290. Referring to FIG. 12, during a portion of a revolution in which a scanning beam 251 strikes corner cube 260, the exiting beam 261 is parallel thereto. If the incident scanning beam 251 is in a plane substantially perpendicular to the planes of the corner cube mirror facets 262, 264 (which are substantially perpendicular to each other) then the exiting beam 261 will also be in the incident scanning beam plane. If incident scanning beam 251 is not in a plane substantially perpendicular to the planes of corner cube mirror facets 262, 264 but at an angle of incidence, then exiting beam 261 will have a substantially equal angle of reflection. Thus, the reading beam appears to be reflected back substantially along the incoming path.

The reading beam 251 generated by a light source such as a laser diode 255, is directed by a fold mirror 273 onto the facet wheel 250 striking either of the facets of the corner cube 260 which may be angled with respect to the facet wheel axis 290 so that the reflected beam 261 is directed at mirror 268, and then is reflected out scan window 108, forming a substantially brighter line segment or aiming beam. In alternative embodiments mirror 268 may be eliminated. Mirror 204, as described earlier with respect to FIG. 2, alternately directs the reading beam 251 for generating the first scan pattern 106 comprised of one or more scan lines.

Referring again to FIG. 1, the base unit 105 may contain a power supply, signal processing, decoding, and/or control electronics and may be connected to the barcode scanner 100 by a hardwired connection or by a wireless connection. Wireless communications may be accomplished by suitable infrared or RF transmission. In the wireless connection embodiment, the scanner 100 will generally be battery powered in the handheld mode; the battery may be charged while in place on the base unit in similar fashion as a cordless telephone. When in place on the base unit 105, connection for both communication and power may be provided through mating electrical contacts in the base 105 and the scanner 100.

Alternatively, the power supply, signal processing, decoding, and/or control electronics may be located on board the barcode scanner 100 with the base unit 105 simply providing mechanical support for the barcode scanner 100.

In this regard, the base unit 105 may be eliminated altogether and the barcode scanner 100 may be a free standing unit, with either a hardwired or wireless connection to a terminal or host computer. The wireless communication may be accomplished by suitable infrared or RF transmission, for example. The barcode scanner 100, either with or without base unit 105, may also be mounted, suspended, or placed in arbitrary locations and at various orientations.

Figure 5:
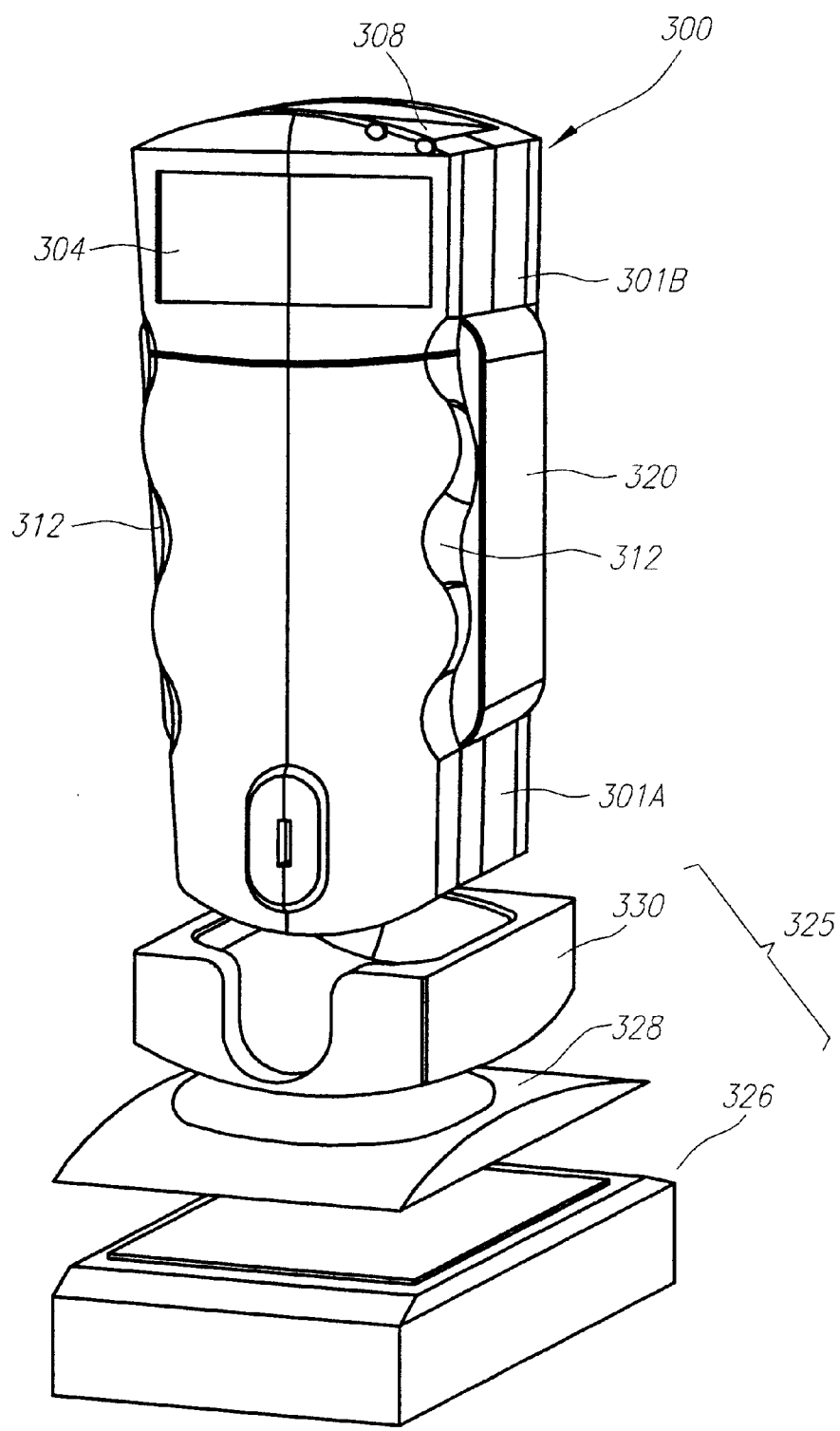
FIG. 5 is an exploded view of the scanner and base unit of FIG. 3 showing the scanner removed from the base unit.

Ergonomics play a significant role in the design of handheld scanners. FIGS. 3–5 illustrate a cordless scanner 300 resting in a base unit 325. The scanner 300 includes a scanner housing 301 which is generally rectangular in cross section with curved sides comprising plural indentations 312 to permit comfortable grasping of the unit. The scanner housing 302 includes a top housing portion 301b and a bottom housing portion 301a. The scanner 300 has two windows, one window for each of the operational modes. The front window 304 faces sidewardly outward into a scan volume beside the scanner 300, the scan volume being defined as beside the scanner when the scanner 300 is placed in its base unit 325. The first scan window 304 is generally located in the top portion 301b of the scanner housing 301.

The second window 308 is located on a top face of the scanner 300 and is used for the handheld operational mode. The scanner 300 may be readily grasped and removed from the base unit 325. The unit 300 may be switched to handheld operation mode by any one of a number of mechanisms as described above. For example, the scanner 300 is shown having a trigger switch 320 which is readily actuated by the operator merely by grasping the housing 302.

The scanner 300 may have a cable connection for providing power and communication link or the unit may be battery powered and cordless with communications accomplished by infrared or RF transmission, for example.

The base unit 325 includes a cup portion 330 into which the scanner 300 may be inserted, a main base section 326 and a swivel section 328 which would allow for some orientation of the scanner 300 during the fixed mode of operation to modify the orientation of the first window 304 and thereby adjust the location of the scan volume.

Figure 6:
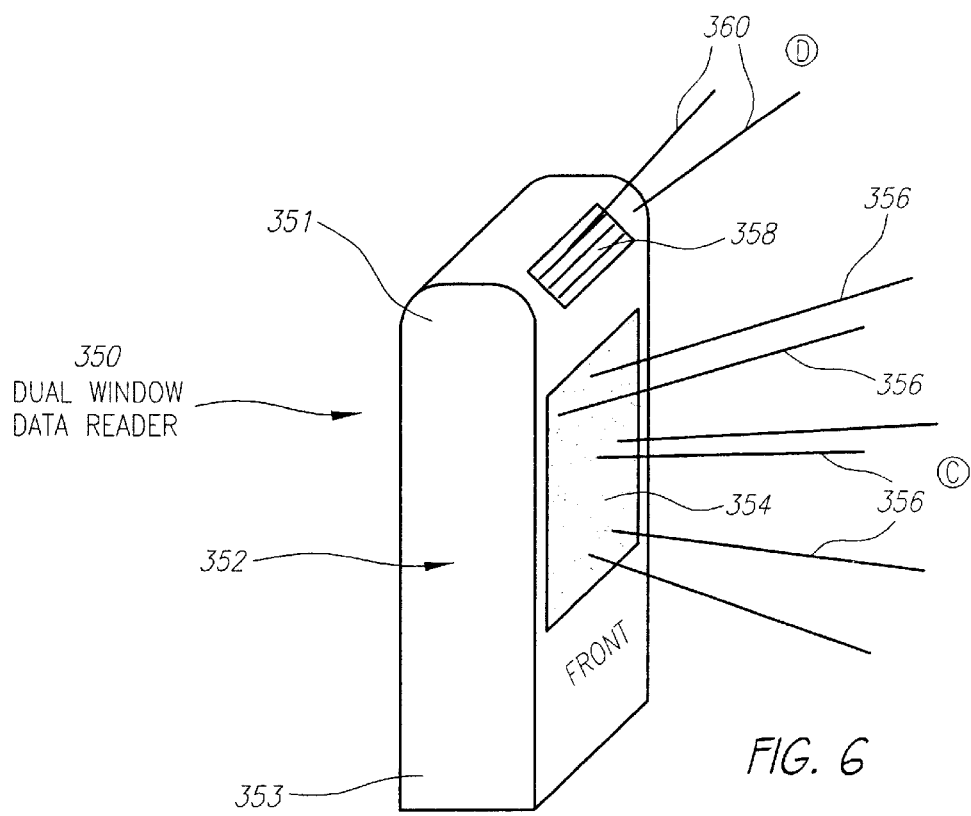
FIG. 6 is a front right side perspective view of an alternate bimodal with the second window in a top-forward position.

FIG. 6 illustrates an alternative scanner 350 having a housing 352 with a top portion 351 and a bottom portion 353. The scanner 350 has a first window 354 for the fixed mode generating a generally denser scan pattern 356 passing into the scan volume C in front of the front face of the scanner 350. A second window 358 is positioned on the top portion 351 of the scanner inclined between front and top surfaces of the scanner 350 whereby the scan pattern 360 is directed generally forward and upward from the scanner 350.

Figure 7:
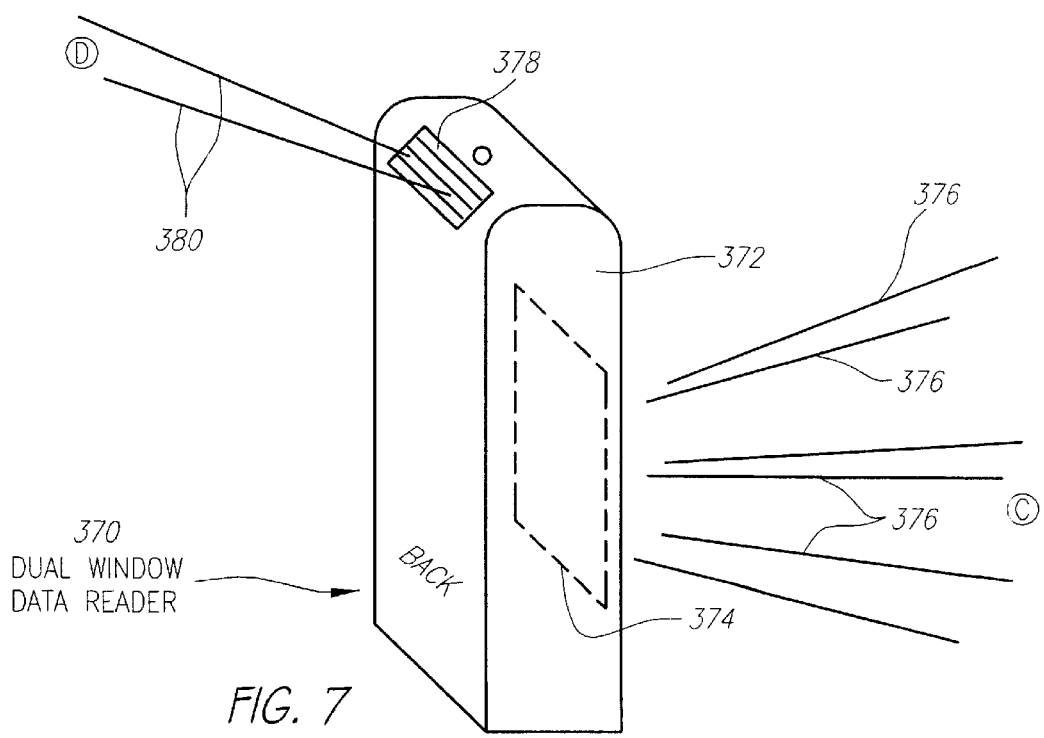
FIG. 7 is a rear right side perspective view of another alternate bimodal scanner with the second window in a top rearward position.

FIG. 7 is a perspective view of another scanner 370 in which the second window 378 for the handheld mode is located on a reartop side of the housing 372. The scan pattern 380 generated through the second window 378 is directed generally rearwardly at a slightly upward angle. The first window 374 is located on the front face (not visible but shown by the dotted lines) through which the generally more dense scan pattern 376 passes into the scan volume C for the fixed mode of operation.

Figure 8:
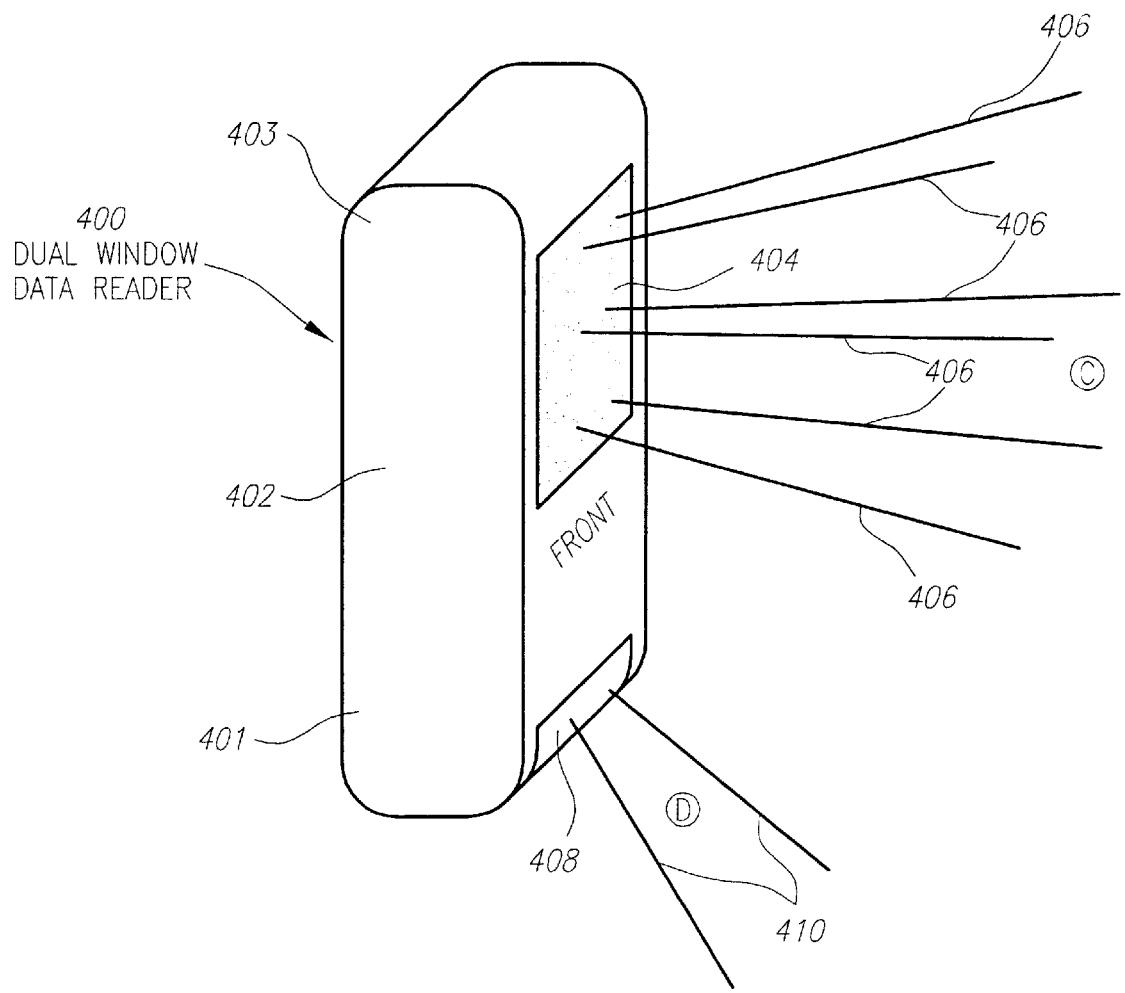
FIG. 8 is a front right side perspective view of another alternate bimodal scanner with the second window in a bottom-forward position.

FIG. 8 illustrates yet another alternate embodiment for a scanner 400 having a first window 404 on the front face thereof through which scan lines 406 generate a scan pattern into the scan volume C for the fixed mode. Housing 402 includes a bottom portion 401 on which the second window 408 is located. The second window 408 is positioned between the bottom surface and the front face which would direct a scan pattern 410 generally downwardly and forwardly from the second window 408. Since the scanner 400 would normally be placed in a holder during the fixed mode, the operator may more readily grasp the top portion 403 of the scanner in locating the second window 408 on the bottom facilitates convenient use of the scanning beams 410 for the handheld mode of operation. Moreover, depending upon the design of the scanner holder (examples of which have been described in previous embodiments), when the scanner 400 is its holder, the second window 408 may be covered thereby blocking scan lines from exiting during the fixed mode.

Figure 9:
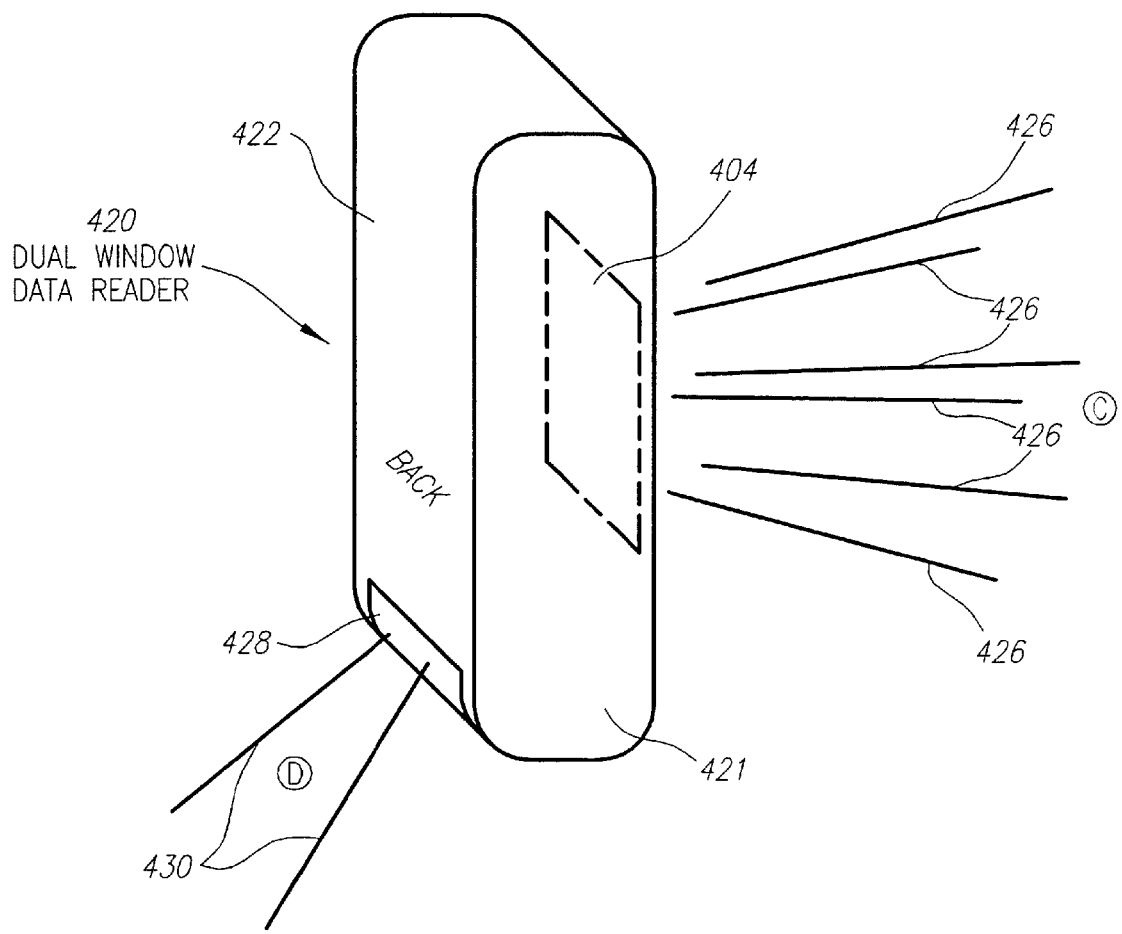
FIG. 9 is a rear right side perspective view of another alternate bimodal scanner with the second window in a bottom-rearward position.

FIG. 9 illustrates yet another scanner 420 which is similar to the scanner 400 of FIG. 8 except the second window 428 is located more toward the rear side of the bottom portion 421 of the scanner housing 420. During the handheld mode, the scan pattern 430 generated when passing through the second window 428 is directed downwardly and rearwardly from the scanner 420. The front or first window 404 (not visible but shown by dashed lines) is located on the front face of the scanner 420. Scanning beams 426 pass through the first window 404 and into the scan volume C in the fixed mode of operation.

Figure 10:
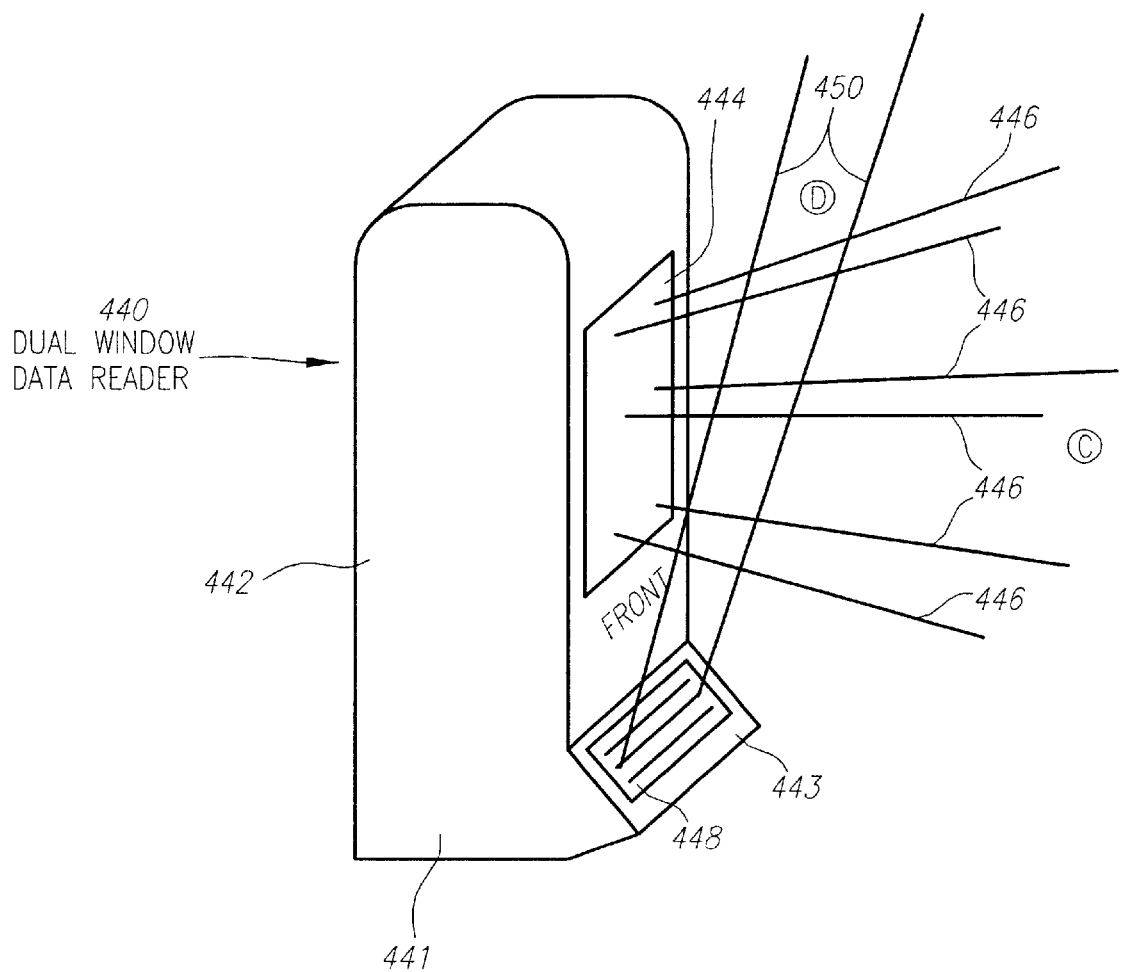
FIG. 10 is front right side perspective view of another alternate bimodal scanner with the second window in an inclined bottom section.

FIG. 10 illustrates yet another alternate embodiment of a scanner 440 having a first window 444 on the front face of the scanner housing 442 through which a scan pattern 446 passes into the scan volume C during the fixed mode of operation. The second window 448 is located in a bottom portion 441 of the scanner housing 442 in an incline section 443 of the bottom housing portion 441.

This incline section 443 extends past the plane of the front face of the scanner (the first window being in the plane of the front face) which allows positioning of the second window 448 such that the scan beams 450 emanating therefrom for use in the handheld mode also pass through the scan volume C. When operating in the fixed mode, the scan lines 450 passing through the second window 448 (provided the beams 540 are activated in the fixed mode) may provide additional scanning coverage in the front scan volume C. When operated in the handheld mode of operation, the scan pattern 446 may be discontinued if desired.

Figure 13:
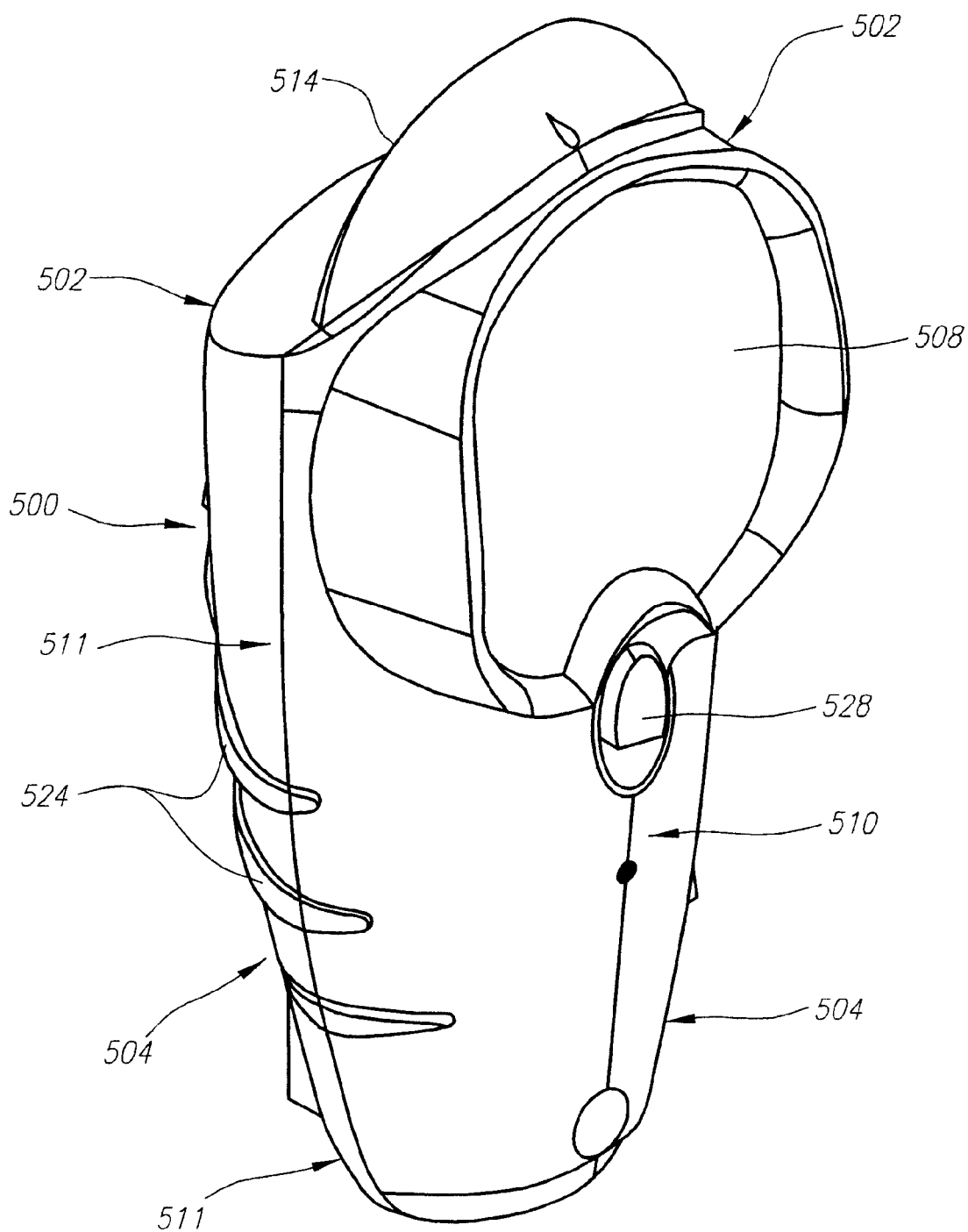
FIG. 13 is a front right side perspective view of a preferred ergonomic bimodal scanner.
Figure 14:
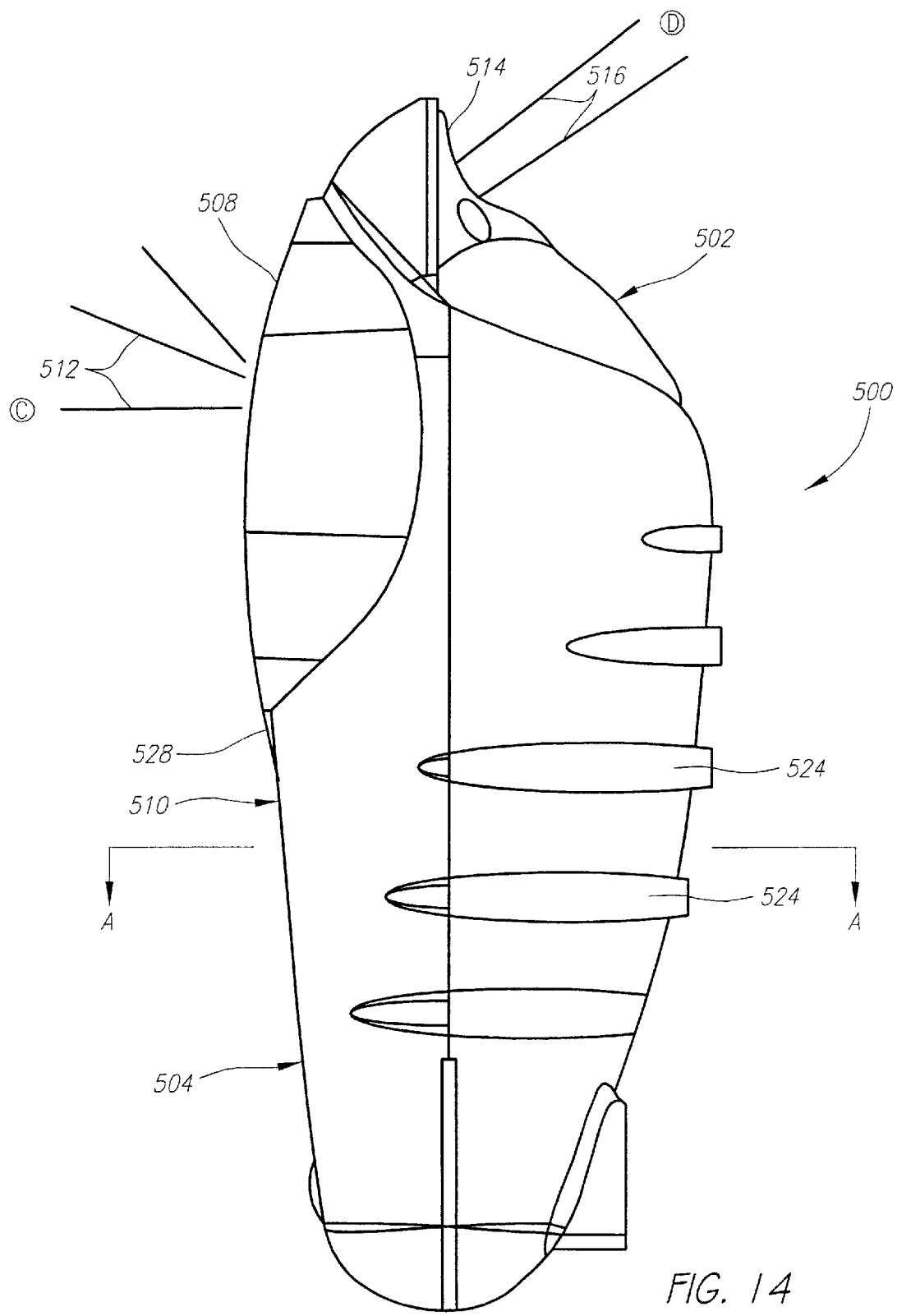
FIG. 14 is a left side elevation view of the scanner of FIG. 13.
Figure 15:
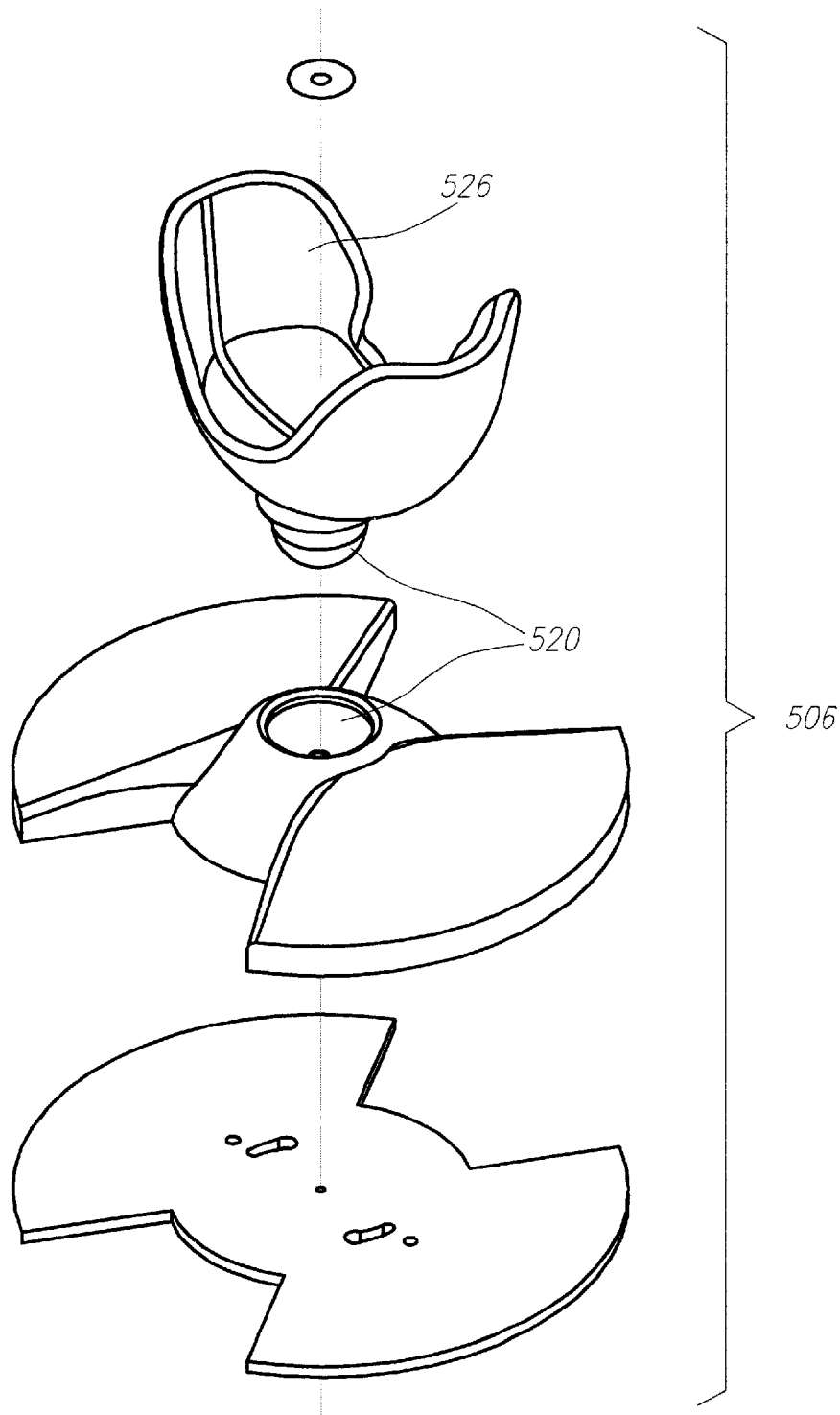
FIG. 15 is an exploded perspective view of a base unit for the scanner of FIGS. 13–14.

FIGS. 13–15 illustrate a preferred embodiment of a multiple mode barcode scanner 500. The barcode scanner 500 includes a top portion 502, a bottom portion 504, a front portion 510 and a back portion 511. When operating in fixed mode, the scanner 500 preferably rests in a base unit 506 which is illustrated in the FIG. 15 exploded view. A first scan window 508 is located on front portion 510, through which a first scan pattern 512 is projected into a first scan volume C in front of first scan window 508. A second scan window 514 is located on top portion 502 through which a second scan pattern 516 is projected into a second scan volume D in front of second scan window 514.

When the barcode scanner 500 is placed in base unit 506 such as for operation in the fixed mode, the scan pattern 512 is optimized for fixed scanning within the scan volume C in front of scan window 508. The scan pattern 512 preferably comprises a multidimensional scan pattern with a relatively large angular field of view suitable for fixed scanning applications. Bar coded objects to be read are passed through the scan volume C (i.e. the sweep mode) or placed within the scan volume C (i.e. the presentation mode).

The base unit 506 contains a swivel 520 which may allow for orientation of the scanner 500 when mounted in base unit 505, which may be particularly useful during the fixed mode of operation, in order to adjust the orientation of first window 508 and thereby adjust the location of scan volume C. The scanner 500 preferably has a low center of gravity providing stability even when tilted at a wide range of angles when resting in the base unit 506, which may be facilitated by placing heavier internal components and/or weights in the bottom portion 504.

When the handheld mode of operation is desired, an operator may lift the barcode scanner 500 from base unit 506. The scan pattern 516, which is optimized for handheld operation, may be directed or aimed toward a barcode to be read thereby putting said bar code within scan volume D in front of scan window 514. An aiming beam may be provided to facilitate handheld use. The scan pattern 516 preferably comprises a pattern of at least one scan line with a longer depth of field and a smaller angular field of view relative to scan pattern 512.

Ergonomics plays an significant role in the industrial design of handheld scanners. The scanner 500 preferably may have substantially symmetrical curvelinear surfaces on front and back portions 510 and 511 whereby a horizontal cross-section A—A in FIG. 14 renders a substantial ellipsoidal shape, thereby providing a convex shape to fit the concave shape created by an operator opening their hand/palm yet curving the ends of their fingers and thumb. Preferably, back portion 511, and in part front portion 510, includes a plurality of grip-strips 524, which are preferably co-molded to permit comfortable, firm, and safe ergonomic grasping of the unit. Co-molded grip-strips 524 may facilitate manufacturing and reduce the cost of scanner housing manufacturing. The bottom portion 504 preferably is tapered, allowing scanner 500 to be easily placed into and removed from concave portion 526 of the base unit 506.

The scanner 500 is depicted with a triggering means shown as a manually-actuated switch 528, which may be used to: activate an aiming beam; activate the scan pattern 516; enable decoding during the time scan pattern 516 is generated; disable the scan pattern 512; and/or disable decoding during the time scan pattern 512 is generated. In a preferred embodiment, both scan patterns 512 and 516 are always enabled, and the switch 528 is used to activate an aiming beam and only enable decoding during the period in which scan pattern 516 is generated.

Figure 16:
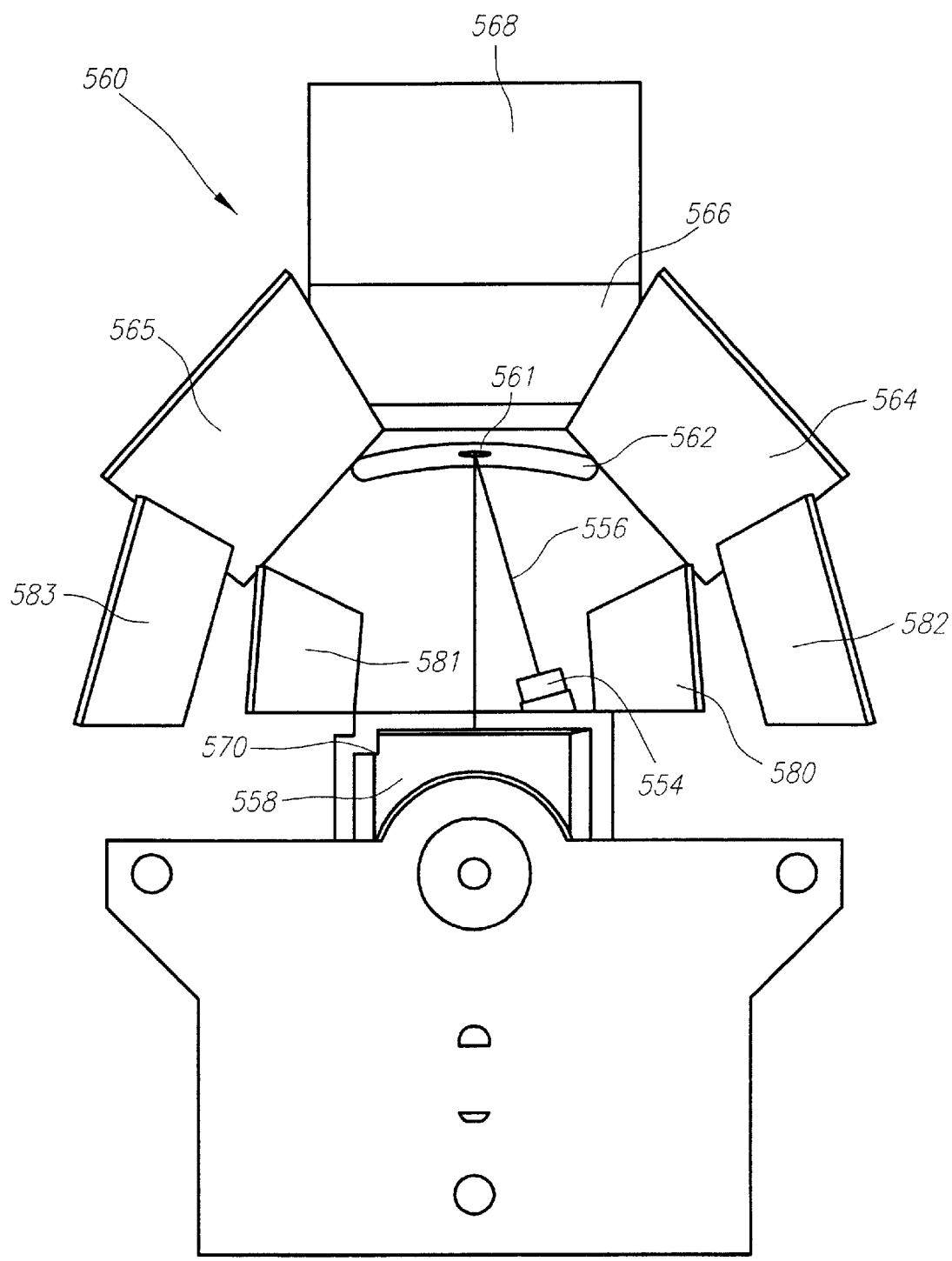
FIG. 16 is a top plan view of a scan engine configuration of the scanner of FIGS. 13–14.
Figure 17:
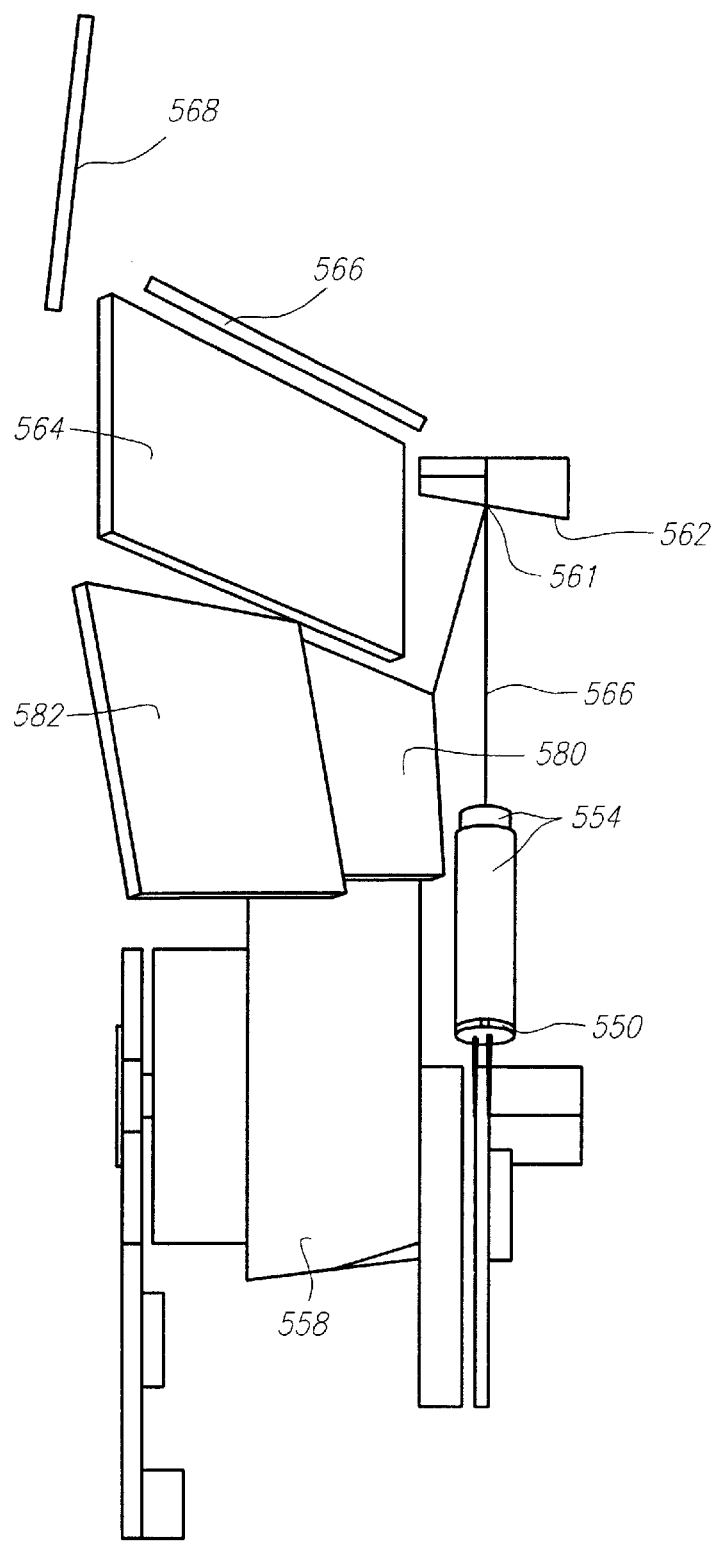
FIG. 17 is a left side elevation view of the scan engine of FIG. 16.

A preferred embodiment scan engine for producing fixed and handheld patterns sequentially during each rotation of the mirrored polygon is shown in FIGS. 16–17. The scan engine mirror basket contains a pair of split pattern mirrors which produce substantially parallel scan lines that cross at different distances from the scan window and exit the scan window at different angles. This provides good performance in both sweep and presentation modes. The scan engine 560 is housed within the top portion 502 of barcode scanner 500 including optical elements for generating scan patterns 512 and 516 from a moving spot generated from a laser scanning beam 556 generated by visible laser diode module (VLDM) 554 which is direct to rotating facet wheel 558. FIG. 16 is a front view of scan engine 560 as if looking through scan window 508 of scanner 500, and FIG. 17 is a side view thereof. A laser diode 550 generates a laser beam which is focused by focusing optics within VLDM 554 to form scanning beam 556 having the desired optical properties for barcode scanning which are well known in the art. Scanning beam 556 preferably is directed to a small insert mirror 561 in a collection mirror 562 toward facet wheel 558. The facet wheel 558 preferably includes two or more mirror facets set at two or more different angles. As facet wheel 558 rotates, scanning beam 556 reflected from any one facet mirror may be sequentially swept across one or more of the pattern mirrors 564, 565, 566, 580, 581, 582 and 583. As scanning beam 556 is swept across any of the pattern mirrors, a scan line is reflected through scan window 508 into scan volume C. One or more of the facet mirrors may be set at an angle so that for at least a portion of a single revolution of facet wheel 558 the reflected beam misses pattern mirrors 564, 565, 566, 580, 581, 582 and 583, which reflect the beam through scan window 508, allowing scanning beam 556 to be directed through scan window 514. In the embodiment illustrated in FIGS. 16 and 17, pattern mirror 566 is shortened, so the beam reflected from one or more of the wheel facets preferably may reflect off of mirror 568 and be directed to the alternate scan window 514.

Figure 18:
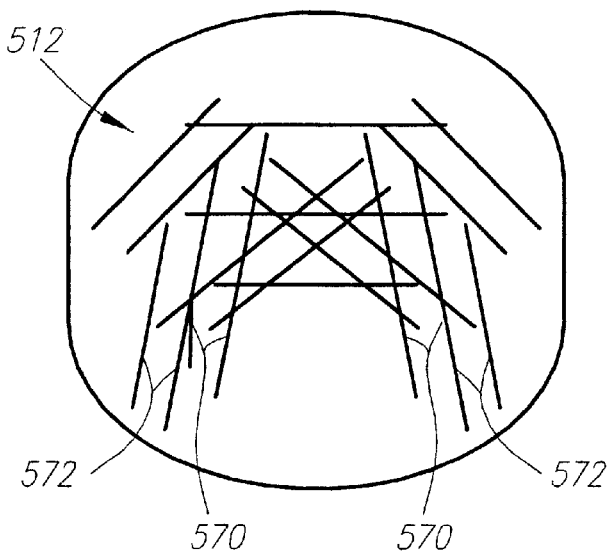
FIG. 18 is a diagram of the scan pattern produced by the scan engine of FIGS. 16–17.

The scan pattern which is projected through scan window 508 may have characteristics which increase first pass read rates for two types of fixed scanner use; presentation mode (wherein a barcoded object is brought toward the scanner in a path substantially perpendicular to the scanner window) and sweep mode (wherein a barcoded object is moved past the scanner window in a path substantially parallel to the scanner window). The scan pattern 512 generated by the embodiment illustrated in FIGS. 16–17 is depicted in FIG. 18, shown at the scan window 508. As illustrated, the pattern comprises a number of lines at a wide range of orientations (their angle and location) which are projected at a small angle from perpendicular to scan window 508, crossing relatively far from scan window 508, which increases first pass read rates when objects with barcodes thereon are presented to scan window 508, preferably mounted in base unit 506. Vertical scan lines are in two groups, the lines 570*a*, 570*b* produced by inner pattern mirrors 580, 581 respectively and the lines 572, 572*b* are produced by outer pattern mirrors 582 and 583 respectively. The lines 572 are projected at a relatively large angle from perpendicular to the scan window 508, crossing relatively close to the scan window 508, which increases first pass read rate when objects with barcodes thereon are swept pass scan window 508.

In this embodiment the split pattern mirror pair 580, 582 and pair 581, 583 are producing substantially vertical scan lines 570*a*, 570*b* and 572*a*, 572*b* respectively and mirror 566 projects scan lines 578 at different angles in a substantially horizontal plane, which may not increase the number of scan lines but may increase the number of orientations (angle and/or location) of the scan lines. The intermediate mirror 564 produces four angled scan lines 573, 574 (one for each primary facet of the wheel 558) while intermediate mirror 565 produces four angled scan lines 575, 576. Alternative embodiments may split different pattern mirrors and/or different sets of pattern mirrors.

Alternately, the scan generation method which include two reading beams (for example two beams created by two VLDM's or a by single VLDM and a beam splitter), two collection mirrors, and two detectors. The arrangement is bilaterally symmetric. A laser beam emerges from a hole in a collection mirror, strikes a rotating polygon facet wheel, reflects off of a pattern mirror, and then through a scan window for fixed mode use. During a portion of a revolution the facet wheel directs the beam in such a way that it does not strike a pattern mirror, and instead the beam exits directly through a different scan window for handheld use.

Numerous alternative embodiments of the scan engine and optics shown in FIGS. 16–17 may be employed. In order to form a denser pattern of scan lines without increasing the scanning speed, two or more laser sources may be employed. Since a return path of light reflected or back scattered from a barcode may be along the outgoing path of the reading beam, although widened considerably, it may be useful to employ a detector for each source.

The scanner may be equipped with a mechanism for producing a signal which is synchronized with the facet wheel rotation. The signal, in conjunction with timers, may be used to control various scanner functions which relate to the facet wheel position such that the scanner functions are optimal for either handheld or fixed scanning. These functions may include scan pattern generation, decoding, and aiming beam generation. In one embodiment, the synchronization signal may be used to disable an aiming beam produced by a corner cube on the facet wheel unless a button is actuated. The synchronization signal may also be also used to disable decoding when a scan line emerges from the scan window for handheld use unless the button is actuated.

There are a number of scanner functions which relate to facet wheel rotation/location for which it may be useful to control according to whether the scanner is in fixed or handheld operation. These functions may include scan pattern generation, aiming beam function, and decoding. In order to control operation of these functions, a signal which is synchronized to the facet wheel rotation, herein referred to as an electrical glitch, may be generated. This electrical glitch may be used to control timers which enable and disable various functions during a certain portion of a revolution. In the embodiment depicted in FIGS. 16–18, for example, generation of an aiming beam, which is preferable in handheld operation, by a corner cube may be disabled unless a switch or trigger is actuated. This disabling is accomplished by turning off the laser diode 550 whenever the scanning beam 556 would strike a corner cube, which happens during a fixed portion of each revolution of facet wheel 558.

The electrical glitch may be generated in many ways. A number of these methods use a laser diode already present for scan pattern generation, and may use a photo detector already present for data capture or alternatively a dedicated photo detector. A preferred embodiment uses a dedicated detector, which may capture an optical signal, herein referred to as an optical glitch, by directing the reading beam toward the detector only when the facet wheel is in a particular orientation, so that one electrical pulse is generated by the detector for each facet wheel revolution. The beam is directed toward the dedicated detector by an optical glitch mirror, wherein the scanning beam will reflect onto the dedicated detector once every revolution. The optical glitch mirror may direct the beam directly toward the dedicated detector, or it may be designed to direct the beam toward any of the mirrors already present which are designed to reflect the beam to the dedicated detector or the existing detector used to detect collected light from a bar code to be read. Alternatively, one or more additional mirrors may be employed separately or in conjunction with pattern mirrors already present, or functional equivalents, allowing the detector to be placed in any convenient location within the scanner.

A number of other means, also using the scanning beam and a dedicated optical glitch detector or alternatively the existing detector, may be used to generate the electrical glitch. Rather than a separate optical glitch mirror, reflective tape or a mirror insert may be placed on any portion of the facet wheel which the scanning beam may strike, the reflective tape or mirror insert may then direct the "glitch" beam toward a detector in a path that may be direct or may involve one or more mirrors or their functional equivalent. An alternative to a -mirror may involve a scan window, especially if the beam is perpendicular to the window.

Alternatively, a beam splitter may be used to direct the glitch beam to a detector, wherein the remaining beam may be used, for example, as the pointer.

Alternatively, the optical glitch mirror may not be on the facet wheel, but at any position within the scanner toward which the scanning beam is reflected by the facet wheel once per revolution, such as corner cube 590. However, this may be located on a pattern mirror, between pattern mirrors, or where a pattern mirror directs the beam. At any one of these locations, the detector may be placed, or a mirror or a functional equivalent may be placed which directs the glitch beam, either directly or after one or more reflections, to a detector. Another alternative to the optical glitch mirror on the facet wheel is simply a hole through the facet wheel, through which the reading beam may proceed toward the detector, either directly or after one or more reflections.

Rather than using a dedicated detector, the electrical glitch may be generated by directing the glitch beam on the detector already present for the purpose of bar code data capture. So that the optical glitch is not confused with bar code data, it may be brighter than any other signal that may be expected during data capture. Any of the methods described supra for use with a dedicated detector may be employed, provided that the path from the optical glitch mirror equivalent leads back to the bar code data detector and provides an optical signal distinguishable from bar code data.

Other alternative embodiments for producing the electrical glitch may employ a light source other than the laser diode which generates the scanning beam. Possible sources include a laser diode or a LED. This second source may be employed with a dedicated detector or with the data detector, in any of the embodiments described above.

If the data detector is used to detect the optical glitch, a stray optical signal may inadvertently be interpreted as the optical glitch. To avoid this problem, it may be useful to capture the optical glitch only once during a startup phase and count motor revolutions to remain synchronized thereafter. Typically, the facet wheel is rotated by a DC brushless motor which produces a Hall output pulse six times for each motor revolution. A divide by six counter may generate a single pulse for each motor revolution. This pulse may be synchronized once to a known facet wheel position by an optical glitch method described supra, after which the Hall pulses may accurately maintain synchronization to facet wheel motion. This embodiment may require accurate orientation of the facet wheel on the motor shaft to ensure the Hall pulses coincide with a known facet wheel orientation. To avoid the requirement for accurate facet wheel orientation while mounting the facet wheel on the motor shaft, it may be useful to employ a phase locked loop multiplier to produce 6N pulses per revolution from the six Hall pulses, and then to employ a divide by 6N counter to produce one pulse per revolution. This may allow the electrical glitch to be accurately synchronized to the facet wheel position within $\frac{1}{6}N$ of a revolution.

Other alternative methods to produce the electrical glitch may not involve an optical glitch at all. A piece of material or a circuit rotating with the facet wheel may generate a signal in a fixed circuit as the rotating material or circuit passes the fixed circuit. For example, a magnet or a circuit with a current which produces a magnetic field may be on the facet wheel, and a circuit which is sensitive to changes in magnetic field, such as a Hall sensor, may produce the electrical glitch as the magnet or circuit on the facet wheel passes the fixed circuit. For example, a piece of material with high magnetic permeability may be on the facet wheel, and a circuit sensitive to its proximity may produce the electrical glitch. Alternatively, a circuit which is sensitive to changes in electric field may produce an electrical glitch as a piece of charged material, such as an electret, passes the fixed circuit. A piece of material with high permissivity may be sensed capacitively, or a capacitor could be split with one portion moving with the facet wheel so that the electrical glitch is produced as it passes the fixed portion of the capacitor. Alternatively, the sensing circuit may be rotated with the facet wheel and the material or other circuit may be fixed.

Once the electrical glitch is generated, a timing means may be used to produce signals to control various scanner functions. The timing means may consist of one or more one shot timers or a microprocessor which may generate timing signals. The timing means and motor may be synchronized during portions of a revolution of the facet wheel by using pulses from one to control the other. The timer signals may be used to control any function which relates to the facet wheel rotation and which may be different in fixed mode or handheld mode. For example, the scan pattern is different in the two modes, and the read rate when the scanner is in one mode of operation may not benefit at all if the other scan pattern is active (e.g. in the preferred embodiment, the read rate would not improve if the fixed scan pattern was active when the scanner was in the handheld mode of operation). A timing signal may be used to turn the scanning beam light source, preferably a visible laser diode, off whenever the facet wheel is aligned to produce a scan line which is not needed in the current mode of operation. This may reduce power consumption, decrease inadvertent reads, extend the life of the light source, reduce servicing, and reduce the likelihood of laser related injuries.

Other functions may be controlled with the electrical glitch synchronized timing signals. Signal processing and or decoding may be disabled whenever the facet wheel is aligned to produce a scan line which is not needed in one mode of operation. This too will reduce power consumption, decrease inadvertent reads, reduce servicing, and inhibit inadvertent reads.

An aiming beam may also be controlled by timing signals, as in a preferred embodiment wherein, during fixed mode use, the laser is turned off whenever the scanning beam would strike a corner cube and produce an aiming beam.

Alternatively, shutting the light source off during a portion of a facet mirror rotation if necessary. Alternatively, micro mirrors or acousto-optic means could be used to redirect the scanning beam to achieve performance discussed above.

Figure 19:
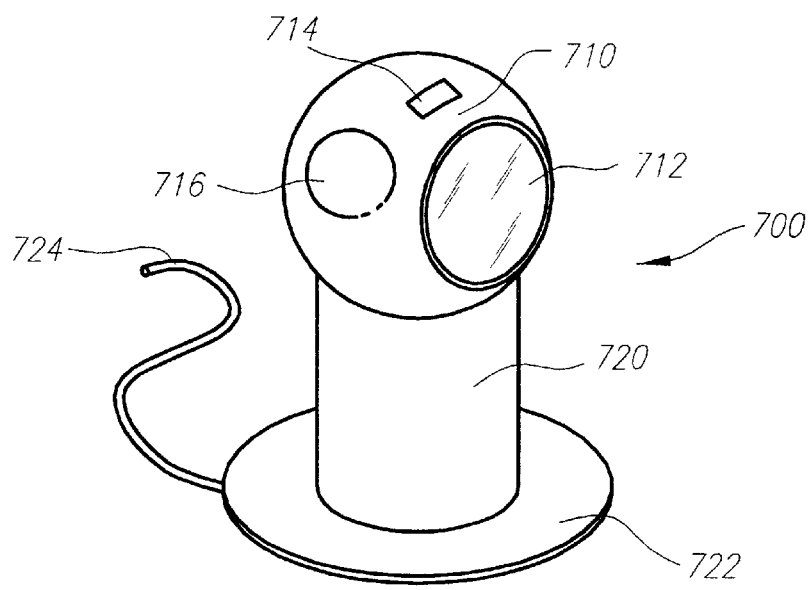
FIG. 19 is a front right side perspective view of another bimodal scanner.
Figure 20:
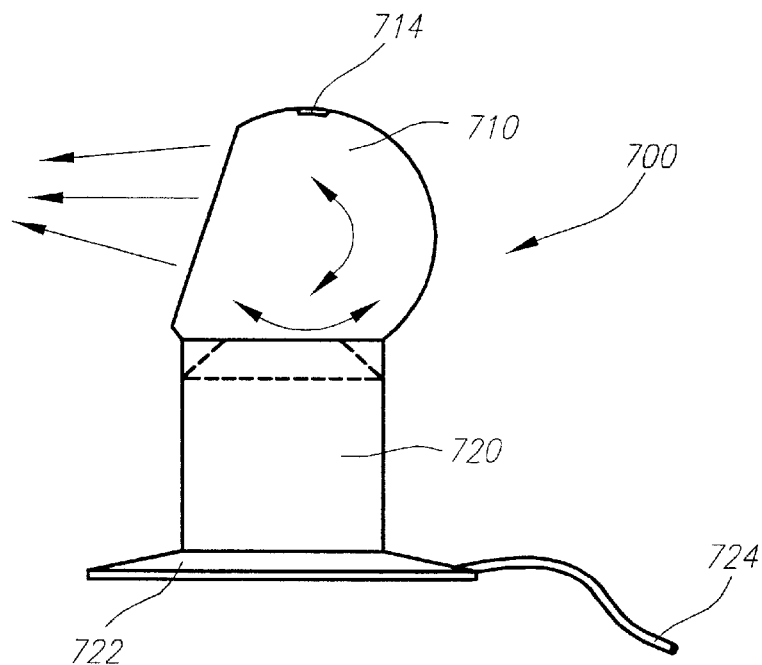
FIG. 20 is a left side elevation view of the scanner of FIG. 19.

FIGS. 19–20 illustrate yet another scanner 700 comprising of a spherical head portion 712, with one or more windows 712, 714. The head portion 710 rests on a pedestal 720 from which the spherical head portion 710 may be removed for handheld use. The scanner 700 may rest on the pedestal 720 in nearly any orientation. Any of the internals of a scanner described herein may be housed in such an embodiment.

The pedestal 700 may house much of the electronics. The head portion 710 may contain the scan engine for generating scan patterns for both fixed and handheld use, as well as a wireless connection to the pedestal 720. The head portion 710 may also include indentations 716 on its sides to readily enable grasping.

The head portion 710 may rest on the pedestal 720 in nearly any orientation, and may be secured in a particular orientation by hook and loop fabric or other suitable mechanical or magnetically releasable retention mechanism. The pedestal portion 720 may include or be supported by a base portion 722 with electrical connection to the host or terminal provided by a suitable cable 724 or wireless connection.

Figure 21:
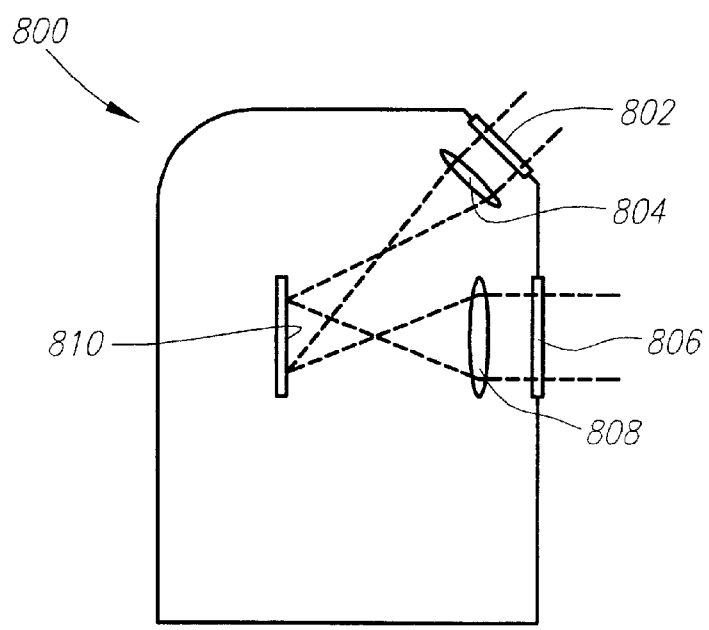
FIG. 21 is a diagrammatic view of a bimodal scanner which employs an imaging array.

FIG. 21 illustrates another alternative embodiment, a multi-window data capture device 800 which employs an imaging array 810. The optics 808 which create an image on the array 800 with light from an object in front of window 806 is optimized for fixed mode operation, providing a wide field of view. The optics 804 which create an image on the array 800 with light from an object in front of window 802 is optimized for handheld mode of operation, providing a large depth of field. This may be accomplished by using a Sheimpflug arrangement, such as described in U.S. Pat. No. 4,978,860, which is herein incorporated by reference. The Sheimpflug arrangement allows the aperture of lens 804 to be as large as desired, to maximize resolution, without substantially affecting the depth of field, since the depth of field is provided primarily by the range of lens to imager distances available because the planes of the imager and the lens are not parallel.

The relative configuration of windows 802 and 806 may be changed by employing mirrors. This may allow many of the configurations described herein which employ a flying spot means to be used with the imaging array of FIG. 21. An alternative embodiment may enable or disable one or the other of the optical paths, depending on the mode of operation. This may be accomplished with a mechanical shutter or with a LCD shutter as described herein. Rather than a shutter and a lens for each mode of operation, a single lens may be used and simply moved from the position of lens 808 to the position of lens 804. This would effectively disable one mode when the other mode is operational. Illumination may be provided by the data capture device, which may be especially useful for handheld operation. Typically, a sheet of light generated by a laser is used for illumination in a Sheimpflug arrangement, and this illumination may also function as an aiming beam. Other specific arrangements for imaging array mechanism are disclosed in allowed U.S. application Ser. No. 08/363,258, which is herein incorporated by reference.

The present invention has been set forth in the form of its preferred embodiments. It is nevertheless intended that modifications to the disclosed barcode readers may be made by those skilled in the art without departing from inventive concepts set forth herein.

What is claimed is:

1. A data reading device comprising
   a housing;
   a first window disposed on a first side of the housing;
   a second window disposed on a second side of the housing;
   a beam scanning mechanism within the housing;
   a light source producing at least one reading beam directed onto the beam scanning mechanism;
   first generating optics for generating a first scan pattern passing through the first window;
   second generating optics for generating a second scan pattern passing through the second window,
   wherein the first scan pattern is optimized for fixed mode scanning and the second scan pattern is optimized for portable mode scanning.

2. A data reading device according to claim 1 wherein the beam scanning mechanism comprises a rotating mirror facet wheel.

3. A data reading device according to claim 1 wherein the second scan pattern comprises a single scan line and the first scan pattern comprises a relatively complex multiple line scan pattern.

4. A data reading device according to claim 1 wherein the first scan pattern optimized for fixed mode is operable for both sweep and presentation modes of scanning.

5. A data reading device according to claim 1 further comprising a switch for switching the data reading device between a first mode generating the first scan pattern and a second mode generating the second scan pattern.

6. A data reading device according to claim 5 wherein the switch comprises a manually-actuated switch.

7. A data reading device according to claim 5 wherein the switch comprises a sensor which detects grasping of the device.

8. A data reading device according to claim 5 wherein in the handheld mode of operation, the data reading device is enabled to read objects with the second scan pattern.

9. A data reading device according to claim 1 further comprising means for switching the data reading device between a first mode of operation wherein the data reading device is enabled to read using both the first and second scan patterns and a second mode of operation wherein the data reading device is enabled to read using only one of the first and second scan patterns.

10. A data reading device according to claim 1 further comprising a motion sensor which, upon sensing motion of the device, switches the data reading device to a handheld mode of operation.

11. A data reading device according to claim 1 wherein the rotating facet wheel includes at least one corner cube containing two facets disposed perpendicularly for generating an aiming beam.

12. A data reading device according to claim 2 further comprising electronics for turning off the light source whenever the reading beam would strike a selected portion of the facet wheel.

13. A data reading device according to claim 1 further comprising means for switching the data reading device between a first mode of operation wherein signal decoding is enabled when generating both the first and second scan patterns and a second mode of operation wherein decoding is enabled when generating only one of the first and second scan patterns.

14. A method for data reading comprising the steps of
   providing a housing having at least one opening;
   providing a rotating facet wheel within the housing;
   generating a reading beam and directing the reading beam onto the facet wheel;
   reflecting the reading beam off facets of the facet wheel to scan the reading beam across a plurality of pattern mirrors for producing a first scan pattern for a first mode of operation and a second scan pattern for a second mode of operation;
   detecting return signals from both the first and second scan patterns being reflected off an item being read and sending the return signals to a decoder;
   wherein in the first mode of operation, selectively decoding only return signal from the first scan pattern and wherein in the second mode of operation, selectively decoding only return signals from the second scan pattern.

15. A method for data reading according to claim 14 further comprising
   selectively switching between operating solely in the first mode of operation and operating solely in the second mode of operation.

16. A method for data reading comprising the steps of
providing a housing having at least one opening;
providing a rotating facet wheel within the housing;
generating a reading beam and directing the reading beam onto the facet wheel;
reflecting the reading beam off facets of the facet wheel to scan the reading beam across a plurality of pattern mirrors for producing a first scan pattern for a first mode of operation and a second scan pattern for a second mode of operation;
optimizing the first scan pattern and mode of operation for a first type of scanning;
optimizing the second scan pattern and mode of operation for a second type of scanning;
switching between the first and second modes of operation, the first mode of operation comprising a fixed mode and the second mode of operation comprising a handheld mode;
optimizing the first scan pattern produced during the fixed mode of operation by generating a complex scan pattern for reading symbols passed in various orientations in a scan volume; and
optimizing the second scan pattern produced during the handheld mode of operation by generating a generally single line scan pattern to be aimed onto a symbol.

17. A method for data reading according to claim 14 further comprising disabling the second mode while operating in the first mode.

18. A method for data reading comprising the steps of
providing a housing having at least one opening;
providing a rotating facet wheel within the housing;
generating a reading beam and directing the reading beam onto the facet wheel;
reflecting the reading beam off facets of the facet wheel-to scan the reading beam across a plurality of pattern mirrors for producing a first scan pattern for a first mode of operation and a second scan pattern for a second mode of operation;
optimizing the first scan pattern and mode of operation for a first type of scanning;
optimizing the second scan pattern and mode of operation for a second type of scanning;
providing the housing with first and second openings;
directing the first scan pattern out the first opening;
directing the second scan pattern out the second opening.

19. A method for controlling a data reading system, the data reading system including a housing, comprising the steps of providing the housing with a first opening and a second opening;
generating a first scan pattern optimized for a fixed mode of scanning through the first opening;
generating a second scan pattern optimized for a handheld mode of scanning through the second opening.

20. A method for controlling a data reading system, the data reading system including a housing, comprising the steps of generating a first scan pattern optimized for a first mode of scanning;
generating a second scan pattern optimized for a second mode of scanning;
detecting return signals from both the first-and second scan patterns being reflected off an item being read;
operating in the first mode of scanning by selectively decoding only scan lines of the first scan pattern.

21. A method according to claim 20 further comprising selecting the desired mode of operation via manual actuation of a switch.

22. A method according to claim 20 further comprising sensing a given operational parameter and automatically selecting the desired mode of operation based upon the parameter.

23. A method according to claim 20 further comprising operating in the second mode of scanning by decoding only scan lines of the second scan pattern and not the scan lines of the first scan pattern.

24. A method according to claim 23, wherein the first scanning mode comprises portable operation and the first scan pattern comprises a single scan line and the second scanning mode comprises fixed operation and the second scan pattern comprises a complex scan pattern of a multiplicity of scan lines.

25. A method according to claim 20 further comprising switching from the first mode to the second mode by controlling a signal processor to decode only scan lines of the second scan pattern and not the scan lines of the first scan pattern.

26. A data reading system, comprising
a housing;
means for generating a first scan pattern optimized for a first mode of scanning and directing the first scan pattern out from the housing;
means for generating a second scan pattern optimized for a second mode of scanning and directing the second scan pattern out from the housing;
means for operating in the first mode of scanning by selectively decoding only scan lines of the first scan pattern.

27. A data reading system, comprising a housing;
means for generating a first scan pattern optimized for a first mode of scanning and directing the first scan pattern out from the housing;
means for generating a second scan pattern optimized for a second mode of scanning and directing the second scan pattern out from the housing;
means for operating in the first mode of scanning by decoding only scan lines of the first scan pattern,
wherein the housing includes a first window and a second window, wherein the first scan pattern is directed out the first window and the second scan pattern is directed out the second window.

* * * * *

UNITED STATES PATENT AND TRADEMARK OFFICE
CERTIFICATE OF CORRECTION

PATENT NO. : 6,575,368 B1
DATED : June 10, 2003
INVENTOR(S) : Thomas E. Tamburrini et al.

It is certified that error appears in the above-identified patent and that said Letters Patent is hereby corrected as shown below:

<u>Drawings,</u>
Sheet 12, replace Fig. 16 with the following:

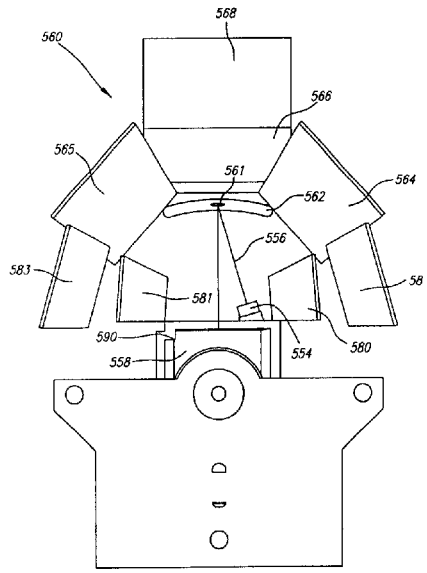

FIG. 16

Sheet 14, replace Fig. 18 with the following:

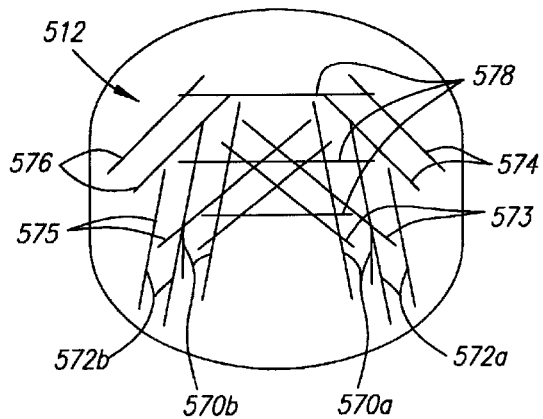

FIG. 18

UNITED STATES PATENT AND TRADEMARK OFFICE
CERTIFICATE OF CORRECTION

PATENT NO. : 6,575,368 B1
DATED : June 10, 2003
INVENTOR(S) : Thomas E. Tamburrini et al.

It is certified that error appears in the above-identified patent and that said Letters Patent is hereby corrected as shown below:

Column 3,
Line 29, "fixed and performance" should read -- fixed performance --.

Column 5,
Line 6, "place" should read -- plane of --.

Column 9,
Line 8, "segment" should read -- segment or --.

Column 10,
Line 54, "reartop" should read -- rear-top --.

Column 13,
Line 32, "and the lines 572" should read -- and the lines 572a --
Line 33, "582 and 583" should read -- 582, 583 --
Line 51, "include" should read -- may include --
Line 53, "a by" should read -- by a --.

Signed and Sealed this

Twenty-third Day of March, 2004

JON W. DUDAS
*Acting Director of the United States Patent and Trademark Office*